(12) United States Patent
Landis et al.

(10) Patent No.: US 11,309,992 B2
(45) Date of Patent: Apr. 19, 2022

(54) USING LATTICE REDUCTION FOR REDUCED DECODER COMPLEXITY

(71) Applicant: QUALCOMM Incorporated, San Diego, CA (US)

(72) Inventors: Shay Landis, Hod Hasharon (IL); Igor Gutman, Ramat Gan (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/512,039

(22) Filed: Jul. 15, 2019

(65) Prior Publication Data

US 2020/0028617 A1  Jan. 23, 2020

Related U.S. Application Data

(60) Provisional application No. 62/699,720, filed on Jul. 17, 2018.

(51) Int. Cl.
*H04L 1/00* (2006.01)
*H04L 25/02* (2006.01)
*H04L 27/36* (2006.01)

(52) U.S. Cl.
CPC .......... *H04L 1/0052* (2013.01); *H04L 1/0003* (2013.01); *H04L 1/0009* (2013.01);
(Continued)

(58) Field of Classification Search
None
See application file for complete search history.

(56) References Cited

U.S. PATENT DOCUMENTS 4,885,688 A * 12/1989 Crawford ............... G06T 17/00
345/427
4,933,956 A * 6/1990 Forney, Jr. ........ H03M 13/1505
375/285
(Continued)

FOREIGN PATENT DOCUMENTS

CN      103997474 A  *  8/2014     ........... H04L 25/067
CN      105356920 A  *  2/2016     ........... H04L 25/067
(Continued)

OTHER PUBLICATIONS

X. Qi and K. Holt, "A Lattice-Reduction-Aided Soft Demapper for High-Rate Coded MIMO-OFDM Systems," in IEEE Signal Processing Letters, vol. 14, No. 5, pp. 305-308, May 2007. (Year: 2007).*

(Continued)

*Primary Examiner* — Berhanu Tadese
(74) *Attorney, Agent, or Firm* — Danai Nelisile Mhembere; Holland & Hart LLP

(57) ABSTRACT

Methods, systems, and devices for wireless communications are described. Some wireless communications systems may utilize beamforming techniques to process wireless communications transmitted in millimeter wave (mmW) frequency ranges. In such cases, a user equipment (UE) may perform lattice reduction (LR)-based preprocessing for a received resource element (RE), which allows the UE to utilize demapping techniques (e.g., minimum mean square error (MMSE)-based demapping techniques or successive interference cancellation (SIC) demapping techniques) that are less computationally-complex than conventional demapping techniques (e.g., maximum likelihood (ML)-based demapping techniques) while providing a similar performance as conventional techniques. Further, due to mmW systems' robustness to time-dispersion, the UE may apply the same LR to multiple REs across multiple symbols in the time (Continued)

domain and across multiple sub-carriers in the frequency domain. The computational cost of performing the LR calculation may be spread across multiple REs and further increase the efficiency of utilizing low-complexity demapping techniques.

30 Claims, 13 Drawing Sheets

(52) U.S. Cl.
CPC .......... *H04L 1/0054* (2013.01); *H04L 1/0061* (2013.01); *H04L 25/0256* (2013.01); *H04L 27/366* (2013.01)

(56) References Cited

U.S. PATENT DOCUMENTS

| | | | | |
|---|---|---|---|---|
| 5,805,613 A * | 9/1998 | Beery | ................ | H03M 13/1105 714/752 |
| 8,270,506 B2 * | 9/2012 | Rog | ................ | H04L 25/0204 375/260 |
| 8,351,529 B2 * | 1/2013 | Siti | ................ | H04L 1/06 375/267 |
| 8,488,711 B2 * | 7/2013 | Huang | ................ | H04L 25/03891 375/260 |
| 8,515,058 B1 * | 8/2013 | Gentry | ................ | H04L 9/008 380/28 |
| 8,532,202 B2 * | 9/2013 | van Zelst | ................ | H04B 7/0854 375/260 |
| 8,718,170 B2 * | 5/2014 | Nissani (Nissensohn) | | H04L 1/0618 375/267 |
| 8,885,758 B2 * | 11/2014 | Huang | ................ | H04L 27/01 375/285 |
| 8,989,283 B1 * | 3/2015 | Dabiri | ................ | H03M 13/19 375/257 |
| 9,025,689 B2 * | 5/2015 | Siti | ................ | H04B 7/0413 375/267 |
| 9,112,552 B2 * | 8/2015 | Ko | ................ | H04B 7/0413 |
| 9,231,794 B2 * | 1/2016 | Siti | ................ | H04L 25/03318 |
| 9,467,177 B1 * | 10/2016 | Dabiri | ................ | H03M 13/2906 |
| 9,647,732 B2 * | 5/2017 | Zhou | ................ | H04L 25/03891 |
| 9,942,013 B2 * | 4/2018 | Malladi | ................ | H04L 5/0032 |
| 10,020,852 B2 * | 7/2018 | Ma | ................ | H04B 7/01 |
| 10,063,290 B2 * | 8/2018 | Xia | ................ | H04B 7/0452 |
| 10,340,956 B2 * | 7/2019 | Mejri | ................ | H04L 1/06 |
| 10,498,486 B1 * | 12/2019 | Stopler | ................ | H04L 1/005 |
| 10,693,701 B2 * | 6/2020 | Fang | ................ | H04L 27/3818 |
| 2004/0017856 A1 * | 1/2004 | Mantelet | ................ | H04L 1/0059 375/262 |
| 2007/0121753 A1 * | 5/2007 | Mcnamara | ................ | H04L 1/0631 375/267 |
| 2007/0201632 A1 * | 8/2007 | Ionescu | ................ | H04L 1/0668 379/88.01 |
| 2007/0217537 A1 * | 9/2007 | Berenguer | ................ | H04L 1/0637 375/267 |
| 2007/0230628 A1 * | 10/2007 | You | ................ | H04L 25/03006 375/340 |
| 2007/0268981 A1 * | 11/2007 | Heiskala | ................ | H04L 1/005 375/267 |
| 2007/0283210 A1 * | 12/2007 | Prasad | ................ | H04L 1/0637 714/755 |
| 2007/0286313 A1 * | 12/2007 | Nikopour-Deilami | | H04L 25/03286 375/341 |
| 2008/0013444 A1 * | 1/2008 | Sandell | ................ | H04L 1/0631 370/203 |
| 2008/0019262 A1 * | 1/2008 | Lillie | ................ | H04L 27/2647 370/208 |
| 2008/0043864 A1 * | 2/2008 | Fujii | ................ | H04L 25/067 375/260 |
| 2008/0049863 A1 * | 2/2008 | Heiskala | ................ | H04L 1/06 375/267 |
| 2008/0075183 A1 * | 3/2008 | Ponnampalam | .. | H04L 25/03242 375/260 |
| 2008/0084948 A1 * | 4/2008 | Mcnamara | ................ | H04L 25/03242 375/341 |
| 2008/0123764 A1 * | 5/2008 | McNamara | ................ | H04L 1/0631 375/261 |
| 2008/0153444 A1 * | 6/2008 | Chen | ................ | H04L 1/0047 455/205 |
| 2008/0159429 A1 * | 7/2008 | Hen | ................ | H04L 25/03006 375/261 |
| 2008/0181128 A1 * | 7/2008 | Milliner | ................ | H04B 7/0413 370/252 |
| 2008/0181335 A1 * | 7/2008 | Ponnampalam | ... | H04L 27/2647 375/319 |
| 2008/0279298 A1 * | 11/2008 | Ben-Yishai | ........ | H04L 25/03242 375/261 |
| 2008/0279299 A1 * | 11/2008 | Reuven | ................ | H04L 25/03318 375/267 |
| 2008/0298225 A1 * | 12/2008 | Oh | ................ | H04L 1/0625 370/206 |
| 2008/0313252 A1 * | 12/2008 | Kim | ................ | H04L 1/0045 708/441 |
| 2009/0003476 A1 * | 1/2009 | Rog | ................ | H04L 25/0246 375/260 |
| 2009/0060078 A1 * | 3/2009 | van Zelst | ................ | H04L 1/06 375/262 |
| 2009/0110120 A1 * | 4/2009 | Mcnamara | ................ | H04L 25/03292 375/340 |
| 2009/0185631 A1 * | 7/2009 | Choi | ................ | H04L 1/06 375/260 |
| 2009/0196360 A1 * | 8/2009 | Gan | ................ | H04L 25/0248 375/260 |
| 2009/0196379 A1 * | 8/2009 | Gan | ................ | H04L 1/0643 375/340 |
| 2009/0238304 A1 * | 9/2009 | Vetter | ................ | H04L 25/03343 375/295 |
| 2009/0252242 A1 * | 10/2009 | Kim | ................ | H04L 1/0009 375/260 |
| 2009/0268839 A1 * | 10/2009 | Gresset | ................ | H04L 1/0625 375/267 |
| 2009/0274230 A1 * | 11/2009 | Heath, Jr. | ............ | H04B 7/0639 375/260 |
| 2010/0034320 A1 * | 2/2010 | Champion | ............ | H04L 1/0631 375/340 |
| 2010/0039443 A1 * | 2/2010 | Mizukura | ............ | H04N 1/6058 345/590 |
| 2010/0183089 A1 * | 7/2010 | VasilÈvich | ........... | H04B 7/0452 375/267 |
| 2010/0202561 A1 * | 8/2010 | Gorokhov | ............ | H04L 27/0008 375/295 |
| 2010/0208837 A1 * | 8/2010 | Vetter | ................ | H04L 27/2602 375/267 |
| 2010/0239043 A1 * | 9/2010 | Li | ................ | H04L 25/03242 375/267 |
| 2010/0329395 A1 * | 12/2010 | Kang | ................ | H04L 1/0052 375/341 |
| 2011/0115675 A1 * | 5/2011 | Sanayei | ................ | H01Q 1/246 342/373 |
| 2011/0142117 A1 * | 6/2011 | Hua | ................ | H04L 1/06 375/227 |
| 2011/0142181 A1 * | 6/2011 | Leshem | ................ | H04L 25/03318 375/341 |
| 2011/0150147 A1 * | 6/2011 | Yang | ................ | H04L 27/34 375/341 |
| 2012/0170689 A1 * | 7/2012 | Huang | ................ | H04L 25/03891 375/340 |
| 2012/0183088 A1 * | 7/2012 | Liao | ................ | H04L 25/0246 375/267 |
| 2012/0207066 A1 * | 8/2012 | Kim | ................ | H03M 13/3761 370/279 |
| 2012/0219082 A1 * | 8/2012 | Sarperi | ................ | H01Q 1/08 375/267 |
| 2012/0236968 A1 * | 9/2012 | Zhou | ................ | H04L 25/0244 375/316 |

(56) References Cited

U.S. PATENT DOCUMENTS

| | | | | |
|---|---|---|---|---|
| 2012/0250785 | A1* | 10/2012 | Vidal | H03M 13/251 |
| | | | | 375/295 |
| 2012/0321085 | A1* | 12/2012 | Belenky | H04L 9/0897 |
| | | | | 380/277 |
| 2013/0064315 | A1* | 3/2013 | Heath, Jr. | H04L 1/0026 |
| | | | | 375/260 |
| 2013/0107989 | A1* | 5/2013 | Ancora | H04B 1/06 |
| | | | | 375/320 |
| 2013/0243068 | A1* | 9/2013 | Aubert | H04B 7/0854 |
| | | | | 375/232 |
| 2013/0272705 | A1* | 10/2013 | Rekaya-Ben Othman | |
| | | | | H04J 14/005 |
| | | | | 398/65 |
| 2013/0315211 | A1* | 11/2013 | Balan | H04B 7/0697 |
| | | | | 370/336 |
| 2014/0050277 | A1* | 2/2014 | Wu | H04B 7/0639 |
| | | | | 375/267 |
| 2014/0056211 | A1* | 2/2014 | Song | H04L 1/0076 |
| | | | | 370/315 |
| 2014/0064204 | A1* | 3/2014 | Seo | H04L 5/0094 |
| | | | | 370/329 |
| 2014/0064354 | A1* | 3/2014 | Nakano | H04J 11/00 |
| | | | | 375/233 |
| 2014/0185716 | A1* | 7/2014 | Aubert | H04L 27/2649 |
| | | | | 375/341 |
| 2014/0254727 | A1* | 9/2014 | Kim | H04L 25/03891 |
| | | | | 375/340 |
| 2014/0314410 | A1* | 10/2014 | Mumtaz | H04B 10/2581 |
| | | | | 398/65 |
| 2015/0009951 | A1* | 1/2015 | Josiam | H04L 25/0224 |
| | | | | 370/330 |
| 2016/0013897 | A1* | 1/2016 | Sun | H04L 5/005 |
| | | | | 370/312 |
| 2016/0204873 | A1* | 7/2016 | Perez De Aranda Alonso | |
| | | | | H04L 27/3416 |
| | | | | 398/43 |
| 2016/0254883 | A1* | 9/2016 | Ma | H04L 25/0246 |
| | | | | 375/267 |
| 2016/0254939 | A1* | 9/2016 | Miyazaki | H04L 25/03891 |
| | | | | 375/341 |
| 2017/0033846 | A1* | 2/2017 | Rende | H04B 7/0413 |
| 2017/0118045 | A1* | 4/2017 | Koo | H04B 1/71072 |
| 2017/0141788 | A1* | 5/2017 | Khsiba | H04L 25/03242 |
| 2017/0149533 | A1* | 5/2017 | Mejri | H04L 25/03203 |
| 2017/0187432 | A1* | 6/2017 | Mejri | H04L 25/03 |
| 2017/0187433 | A1* | 6/2017 | Khsiba | H04L 1/0031 |
| 2017/0187445 | A1* | 6/2017 | Khsiba | H04B 7/08 |
| 2017/0264392 | A1* | 9/2017 | Mejri | H04L 1/0052 |
| 2017/0290046 | A1* | 10/2017 | Sun | H04J 11/0036 |
| 2017/0294940 | A1* | 10/2017 | Nuzman | H04M 11/062 |
| 2017/0295037 | A1* | 10/2017 | Mejri | H04L 1/0631 |
| 2018/0011195 | A1* | 1/2018 | Perry | G01S 17/89 |
| 2018/0129700 | A1* | 5/2018 | Naccache | G06F 16/9024 |
| 2018/0175971 | A1* | 6/2018 | Mejri | H04B 7/0413 |
| 2018/0175972 | A1* | 6/2018 | Mejri | H04L 25/0242 |
| 2018/0212737 | A1* | 7/2018 | Suh | H04L 1/0045 |
| 2018/0241591 | A1* | 8/2018 | Rekaya-Ben Othman | |
| | | | | H04L 1/0054 |
| 2018/0276014 | A1* | 9/2018 | Kliuchnikov | G06F 9/45508 |
| 2018/0287675 | A1* | 10/2018 | Sheikh | H04B 7/0413 |
| 2018/0367374 | A1* | 12/2018 | Liu | H04L 5/0051 |
| 2019/0068318 | A1* | 2/2019 | Marinier | H04L 1/0065 |
| 2020/0007294 | A1* | 1/2020 | Yang | H04L 5/0094 |
| 2020/0028617 | A1* | 1/2020 | Landis | H04L 25/0328 |
| 2020/0028640 | A1* | 1/2020 | Yeo | H04L 5/005 |
| 2020/0068548 | A1* | 2/2020 | Guan | H04W 72/044 |
| 2020/0259544 | A1* | 8/2020 | Demmer | H04B 7/0413 |

FOREIGN PATENT DOCUMENTS

| | | | | |
|---|---|---|---|---|
| CN | 106357312 | A * | 1/2017 | H04L 25/067 |
| EP | 1879341 | A2 * | 1/2008 | H04L 1/0631 |
| EP | 2315404 | A1 * | 4/2011 | H04L 27/2647 |
| EP | 2469730 | A1 * | 6/2012 | H04B 7/0697 |
| EP | 2525537 | A1 * | 11/2012 | H04L 25/03216 |
| EP | 3471284 | A4 * | 5/2019 | H04L 5/0044 |
| GB | 2429884 | A * | 3/2007 | H04L 1/0631 |
| GB | 2446659 | A * | 8/2008 | H04L 25/067 |
| GB | 2453772 | A * | 4/2009 | H04L 25/03235 |
| GB | 2453776 | A * | 4/2009 | H04L 25/0204 |
| GB | 2457507 | A * | 8/2009 | H04L 1/0631 |
| KR | 101417016 | B1 * | 7/2014 | H04L 25/067 |
| KR | 20170043231 | A * | 4/2017 | H04L 25/067 |
| WO | WO-2012072228 | A1 * | 6/2012 | H04B 7/0885 |
| WO | WO-2012115678 | A1 * | 8/2012 | H04L 25/03305 |
| WO | WO-2019113046 | A1 * | 6/2019 | H01Q 21/28 |

OTHER PUBLICATIONS

Park et al., Lattice Reduction-Aided Successive Interference Cancelation for MIMO Interference Channels, IEEE, vol. 63, No. 8, Oct. 2014 (Year: 2014).*

Zu et al. "Flexible Coordinated Beamforming with Lattice Reduction for Multi-User Massive MIMO Systems", IEEE 2014 (Year: 2014).*

Aubert et al., Lattice Reduction-Aided Minimum Mean Square Error K-Best Detection for MIMO Systems, IEEE 2012 (Year: 2012).*

International Search Report and Written Opinion—PCT/US2019/042022—ISA/EPO—dated Oct. 2, 2019 (183924WO).

Ivanov A., et al., "Smart Sorting in Massive MIMO Detection", 2018 14th International Conference on Wireless and Mobile Computing, Networking and Communications (WIMOB), IEEE, Oct. 15, 2018 (Oct. 15, 2018), pp. 1-6, XP033476426, DOI: 10.1109/WIMOB.2018.8589084 [retrieved on Dec. 26, 2018] Section I.

Liu W., et al., "Computationally Efficient Lattice Reduction for MIMO-OFDM Systems", 2010 IEEE 6th International Conference on Wireless and Mobile Computing, Networking and Communications (WIMOB), IEEE, Piscataway, NJ, USA, Oct. 11, 2010 (Oct. 11, 2010), pp. 264-267, XP031807963, ISBN: 978-1-4244-7743-2, Sections I., II. and III.

Wubben D., et al., "Near-Maximum-Likelihood Detection of MIMO Systems Using MMSE-based Lattice-Reduction", 2004 IEEE International Conference on Communications; ICC 2004; Jun. 20-24, 2004, Paris, IEEE Operations Center, Piscataway, NJ, USA, vol. 2, Jun. 20, 2004 (Jun. 20, 2004), pp. 798-802, XP010710431, DOI: 10.1109/ICC.2004.1312611, ISBN: 978-0-7803-8533-7, Sections II., III. and IV.; figure 1.

Yang S., et al., "Fifty Years of MIMO Detection: The Road to Large-Scale MIMOs", IEEE Communications Surveys & Tutorials, vol. 17, No. 4, Nov. 18, 2015 (Nov. 18, 2015), pp. 1941-1988, XP011590624, DOI: 10.1109/COMST.2015.2475242 [retrieved on Nov. 18, 2015] Sections VIII. (in particular VIII. E) and IX.

\* cited by examiner

USING LATTICE REDUCTION FOR REDUCED DECODER COMPLEXITY

CROSS REFERENCE

The present Application for Patent claims the benefit of U.S. Provisional Patent Application No. 62/699,720 by LANDIS, et al., entitled "USING LATTICE REDUCTION FOR REDUCED DECODER COMPLEXITY," filed Jul. 17, 2018, assigned to the assignee hereof, and expressly incorporated herein.

BACKGROUND

The following relates generally to wireless communications, and more specifically to using lattice reduction (LR) for reduced decoder complexity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may operate in millimeter wave (mmW) frequency ranges (e.g., 28 GHz, 40 GHz, or 60 GHz). Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path loss at these frequencies. Due to the increased amount of path loss in mmW communication systems, transmissions from the base station and/or the UE may be beamformed. Conventional techniques for demapping and decoding of transmissions are deficient.

SUMMARY

The described techniques relate to improved methods, systems, devices, or apparatuses that support using lattice reduction (LR) for reduced decoder complexity. Generally, the described techniques provide for a user equipment (UE) to apply LR techniques for generating a transformation matrix that can be reused over a set of resource elements to reduce computational complexity for demapping and decoding of symbols of a received beamformed transmission. Further, LR-based low-complexity demapping and decoding procedures may provide similar performance to demapping and decoding procedures that are more computationally complex.

In some cases, a base station may transmit a configuration message that indicates a number of spatial layers and a coding scheme corresponding to a beamformed transmission to a UE. The base station may transmit the beamformed transmission according to the UE using the number of spatial layers and coding scheme indicated in the configuration message. Upon receiving the beamformed transmission, the UE may determine a channel estimate for an RE in which one or more symbols of the beamformed transmission are received.

The UE may then apply an LR calculation to the channel estimate to calculate a transformation matrix that may permit the UE to use a less-computationally complex demapping procedure (e.g., minimum mean square error (MMSE)-based demapping, or successive interference cancellation (SIC)-based demapping, etc.) for demapping of symbols of the beamformed transmission. Further, due to robustness of beamformed transmissions to time-dispersion (e.g., in the frequency domain and in the time domain), the UE may apply the same transformation matrix to multiple resource elements (REs) of the beamformed transmission across multiple symbols in the time domain and/or across multiple sub-carriers in the frequency domain. Thus, the computational cost of performing the LR calculation to generate the transformation matrix may be spread across multiple REs of the beamformed transmission. The UE may then decode the beamformed transmission in accordance with the demapping. Beneficially, the UE may apply the transformation matrix over a set of resource elements to reduce computational complexity for demapping and decoding of symbols of a received beamformed transmission.

A method of wireless communication at a wireless device is described. The method may include receiving a configuration message indicating a number of spatial layers and a modulation and coding scheme for a beamformed transmission, receiving the beamformed transmission in accordance with the configuration message, determining a channel estimate for an RE in which a first symbol of the beamformed transmission is received, applying LR to the channel estimate to determine a transformation matrix, and decoding the first symbol and a second symbol of the beamformed transmission based on the transformation matrix.

An apparatus for wireless communication at a wireless device is described. The apparatus may include a processor, memory in electronic communication with the processor, and instructions stored in the memory. The instructions may be executable by the processor to cause the apparatus to receive a configuration message indicating a number of spatial layers and a modulation and coding scheme for a beamformed transmission, receive the beamformed transmission in accordance with the configuration message, determine a channel estimate for an RE in which a first symbol of the beamformed transmission is received, apply LR to the channel estimate to determine a transformation matrix, and decode the first symbol and a second symbol of the beamformed transmission based on the transformation matrix.

Another apparatus for wireless communication at a wireless device is described. The apparatus may include means for receiving a configuration message indicating a number of spatial layers and a modulation and coding scheme for a beamformed transmission, receiving the beamformed transmission in accordance with the configuration message, determining a channel estimate for an RE in which a first symbol of the beamformed transmission is received, applying LR to the channel estimate to determine a transformation matrix, and decoding the first symbol and a second symbol of the beamformed transmission based on the transformation matrix.

A non-transitory computer-readable medium storing code for wireless communication at a wireless device is described. The code may include instructions executable by a processor to receive a configuration message indicating a number of spatial layers and a modulation and coding scheme for a beamformed transmission, receive the beamformed transmission in accordance with the configuration message, determine a channel estimate for an RE in which a first symbol of the beamformed transmission is received, apply LR to the channel estimate to determine a transformation matrix, and decode the first symbol and a second symbol of the beamformed transmission based on the transformation matrix.

Some examples of the method, apparatuses, and non-transitory computer-readable medium described herein may further include operations, features, means, or instructions for applying the transformation matrix to an initial lattice domain to determine a transformed lattice domain, the initial lattice domain including a set of constellation symbols and the transformed lattice domain including a set of transformed constellation symbols.

Some examples of the method, apparatuses, and non-transitory computer-readable medium described herein may further include operations, features, means, or instructions for determining, in the transformed lattice domain, a first set of distance measurements between a set of symbol pairs, each symbol pair of the set of symbol pairs including the first symbol and a respective transformed constellation symbol of the set of transformed constellation symbols and identifying a subset of the set of symbols pairs based on the first set of distance measurements.

In some examples of the method, apparatuses, and non-transitory computer-readable medium described herein, identifying the subset of the set of symbols pairs further may include operations, features, means, or instructions for selecting a list size number of the set of symbol pairs based on the first set of distance measurements, each selected symbol pair of the set of symbol pairs having a shorter distance measurement than any unselected symbol pair of the set of symbol pairs.

Some examples of the method, apparatuses, and non-transitory computer-readable medium described herein may further include operations, features, means, or instructions for identifying a subset of a set of constellation symbols of the initial lattice domain that correspond to a subset of the set of transformed constellation symbols included within the subset of the set of symbols pairs, determining, in the initial lattice domain, a second set of distance measurements between the first symbol and a respective constellation symbol within the subset of the set of constellation symbols and determining a logarithmic likelihood ratio for the first symbol based on the second set of distance measurements, where the first symbol may be decoded based at least in part of the logarithmic likelihood ratio.

In some examples of the method, apparatuses, and non-transitory computer-readable medium described herein, each distance measurement of the first set of distance measurements and each distance measurement of the second set of distance measurements may be an MISE distance estimate.

Some examples of the method, apparatuses, and non-transitory computer-readable medium described herein may further include operations, features, means, or instructions for determining, in the transformed lattice domain, a third set of distance measurements between a second set of symbol pairs, each symbol pair of the second set of symbol pairs including the second symbol and a respective transformed constellation symbol of the set of transformed constellation symbols, identifying a subset of the second set of symbols pairs based on the third set of distance measurements, identifying a second subset of the set of constellation symbols of the initial lattice domain that correspond to a second subset of the set of transformed constellation symbols included within the subset of the second set of symbols pairs, determining, in the initial lattice domain, a fourth set of distance measurements between the second symbol and a respective constellation symbol within the second subset of the set of constellation symbols and determining a second logarithmic likelihood ratio for the second symbol based on the fourth set of distance measurements, where the second symbol may be decoded based on the second logarithmic likelihood ratio.

In some examples of the method, apparatuses, and non-transitory computer-readable medium described herein, applying the LR further may include operations, features, means, or instructions for determining the transformation matrix based on a column correlation criterion.

In some examples of the method, apparatuses, and non-transitory computer-readable medium described herein, the decoding further may include operations, features, means, or instructions for decoding a set of symbols of the beamformed transmission based on the transformation matrix, the set of symbols including the first symbol and the second symbol.

In some examples of the method, apparatuses, and non-transitory computer-readable medium described herein, a first subset of the set of symbols corresponds to a first spatial layer and a second subset of the set of symbols corresponds to a second spatial layer, the second spatial layer differing from the first spatial layer.

Some examples of the method, apparatuses, and non-transitory computer-readable medium described herein may further include operations, features, means, or instructions for determining a channel property associated with the beamformed transmission and identifying, based on the channel property, a number of resource elements associated with the beamformed transmission on which to apply the transformation matrix.

In some examples of the method, apparatuses, and non-transitory computer-readable medium described herein, the number of resource elements corresponds to a number of different sub-carriers in a same symbol period.

In some examples of the method, apparatuses, and non-transitory computer-readable medium described herein, the number of resource elements corresponds to a number of sub-carriers located in a set of different symbol periods.

In some examples of the method, apparatuses, and non-transitory computer-readable medium described herein, the channel property may be a delay property, a Doppler spread property, or both.

In some examples of the method, apparatuses, and non-transitory computer-readable medium described herein, the transformation matrix includes real and integer numbers.

In some examples of the method, apparatuses, and non-transitory computer-readable medium described herein, applying the LR further may include operations, features, means, or instructions for applying the transformation matrix to the channel estimate to determine a transformed channel estimate and performing matrix decomposition of the transformed channel estimate into a product of an orthogonal matrix and an upper triangular matrix.

Some examples of the method, apparatuses, and non-transitory computer-readable medium described herein may further include operations, features, means, or instructions for applying the transformation matrix to an initial lattice domain to determine a transformed lattice domain, the initial lattice domain including a set of constellation symbols and the transformed lattice domain including a set of transformed constellation symbols, determining, based on the orthogonal matrix and the upper triangular matrix, a first set of distance measurements between a set of symbol pairs in the transformed lattice domain, each symbol pair of the set of symbol pairs including the first symbol and a respective transformed constellation symbol of the set of transformed constellation symbols, identifying a subset of the set of symbols pairs based on first set of distance measurements, identifying a subset of the set of constellation symbols of the initial lattice domain that correspond to a subset of the set of transformed constellation symbols included within the subset of the set of symbols pairs, determining, in the initial lattice domain, a second set of distance measurements between the first symbol and a respective constellation symbol within the subset of the set of constellation symbols and determining a logarithmic likelihood ratio for the first symbol based on the second set of distance measurements, where the first symbol may be decoded based on the logarithmic likelihood ratio.

In some examples of the method, apparatuses, and non-transitory computer-readable medium described herein, each distance measurement of the first set of distance measurements and each distance measurement of the second set of distance measurements may be an SIC distance estimate.

Some examples of the method, apparatuses, and non-transitory computer-readable medium described herein may further include operations, features, means, or instructions for generating a bit sequence based on decoding the first symbol and the second symbol and determining whether the bit sequence passes error detection.

In some examples of the method, apparatuses, and non-transitory computer-readable medium described herein, the configuration message indicates a defined quadrature amplitude modulation and a defined coding rate for the beamformed transmission.

DETAILED DESCRIPTION

Figure 1:
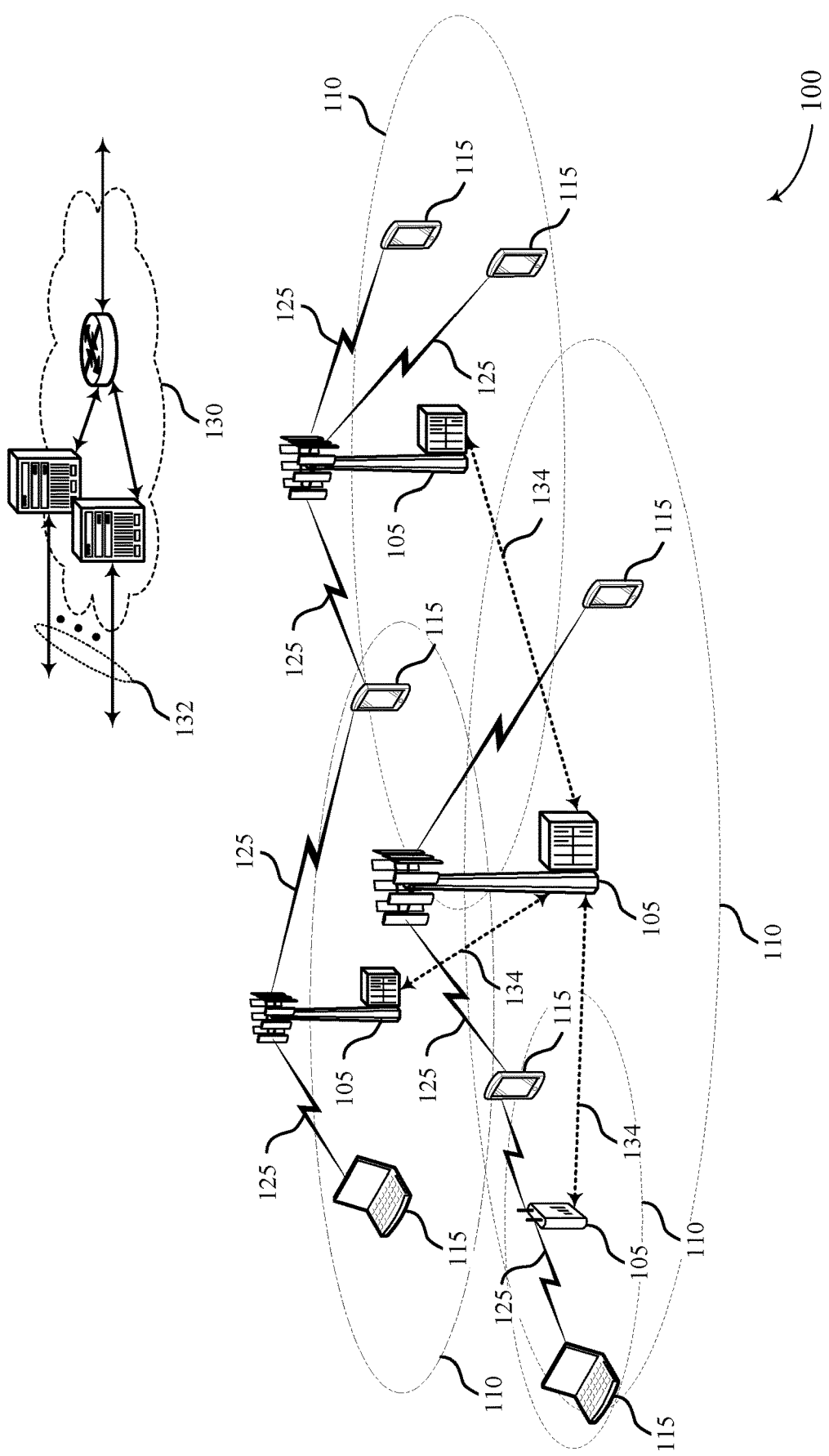
FIGS. 1 and 2 illustrate examples of wireless communications systems that support using lattice reduction (LR) for reduced decoder complexity in accordance with aspects of the present disclosure.

The described techniques relate to improved methods, systems, devices, or apparatuses that support using lattice reduction (LR) for reduced demapping complexity. Generally, the described techniques provide for performing an LR calculation on a channel estimate of a first resource element (RE) within a set of REs in which a beamformed transmission is received to generate a transformation matrix.

Generating the transformation matrix may allow a receiver, such as a user equipment (UE) to apply a simpler demapping procedure, such as minimum mean square error (MMSE)-based demapping, or successive interference cancellation (SIC)-based demapping, or the like, to received symbols of a beamformed transmission. Moreover, due to robustness of beamformed transmissions to time-dispersion (e.g., in the frequency domain and in the time domain), the UE may apply the same transformation matrix to multiple resource elements (REs) of the beamformed transmission across multiple symbols in the time domain and/or across multiple sub-carriers in the frequency domain. Thus, the computational cost of generating the transformation matrix may be spread over a set of REs of the beamformed transmission. Beneficially, the techniques described herein may decrease the computational cost for demapping and decoding a beamformed transmission while providing a similar performance to more computationally complex demapping techniques. Thus, utilizing LR techniques with an MMSE-based demapper, and SIC-based demapper, or the like may be useful to reduce the cost (e.g., computational cost or die size cost) and power usage associated with demapping and decoding transmissions over channels that have small dispersiveness in time and/or frequency.

Some wireless communications systems may utilize beamforming techniques to process wireless communications transmitted in millimeter wave (mmW) frequency ranges (e.g., 28 GHz, 40 GHz, or 60 GHz). When utilizing beamforming techniques, a base station may transmit directional transmissions (e.g., beams) to a UE, where the directional transmissions are less time dispersive than transmissions of conventional wireless communications systems (e.g., sub-6 GHz wireless communications systems such as Long Term Evolution (LTE)). In some cases, the directional transmissions occupy a relatively large bandwidth to offer high data rates at ultra-low latencies, as compared to non-directional transmissions.

Conventional demapping procedures (e.g., maximum-likelihood (ML) demapping procedures) require a receiver, such as a UE, to perform highly-complex calculations on every RE of a transmission. As the number of REs (and the size of utilized bandwidths) included in a transmission increases (as is the case in mmW systems), the computational-cost of performing conventional (e.g., ML-based) demapping procedures, and the associated silicon die size, greatly increases, resulting in high power usage at a UE. Other types of demapping techniques are less computationally complex, such as MMSE demapping, SIC demapping, or the like, but may result in worse decoding performance as compared to decoding techniques that are a function of ML-based demapping.

In accordance with the techniques described herein, a UE may determine a channel estimate of an RE from a set of REs over which a beamformed channel transmission is received and determine an initial lattice domain corresponding to the channel estimate. The initial lattice domain may be a set of constellation symbols that correspond to the unique bit sequences that may be represented by a beamformed transmission across an RE, and the initial lattice domain may include an amplitude and phase vector representation of a received beamformed transmission across the RE.

The UE may determine a transformation matrix that reduces the correlation between the columns of the channel estimate and a transformed channel estimate, where the transformed channel estimate corresponds to a transformed lattice domain. The transformed lattice domain may include a set of transformed constellation symbols, where each transformed constellation symbol corresponds to a constellation symbol. Further, the transformed lattice domain may include a transformed vector that corresponds to the vector of the initial lattice domain. The UE may perform MMSE distance calculations between each transformed constellation symbol and the transformed vector, which may allow the UE to determine the set of constellation symbols that have the smallest distance to the transformed vector in the transformed lattice domain. In some cases, the UE may perform similar techniques that use SIC-based demapping.

The UE may then perform MMSE distance calculations between the subset of constellation symbols that correspond to the subset of transformed constellation symbols that have the smallest distance to the transformed vector and the vector in the initial lattice domain. The UE may use these MMSE distance calculations in the initial lattice domain to determine a logarithmic likelihood ratio (LLR) for the beamformed transmissions. The UE may use the LLR for the beamformed transmission for an error detection procedure to determine whether the beamformed transmissions were successfully received.

When the UE receives multiple symbols on a scheduled RE (e.g., on multiple spatial layers), an MMSE-based demapper may repeat the demapping procedure described above for each symbol on the scheduled RE in each layer. However, because beamformed transmissions are robust against time dispersion (due to the strong line of sight component of mmW communications), and because a UE may infrequently change locations (change locations at slow speeds), channel conditions may not significantly vary from one RE to another (across frequency and/or time resources). Further, transmission delay and Doppler spread may be limited such that an MMSE-based demapper may apply the same LR to the channel estimates of multiple REs across the frequency domain and the time domain. By applying an LR calculation to the channel estimate of an RE, an MMSE-based demapper may be able to utilize MMSE-based demapping techniques, which may be less computationally complex than an ML-based demapping technique. Further, MMSE-based demapping techniques and SIC-based demapping techniques that utilize a transformation matrix determined based on an LR calculation may provide the same performance as more computationally-complex (e.g., ML-based) demapping techniques. Thus, a UE may use a less-complex (e.g., and less-costly) demapping technique (e.g., an MMSE-based or an SIC-based demapping technique) that provides the same performance as a more complex and more costly demapping techniques (e.g., an ML-based demapping technique), as the conventional implementations of the more complex demapping techniques do not take advantage of mmW systems' characteristics of low time dispersion compared to conventional wireless communications systems (e.g., sub-6 GHz wireless communications systems). This may reduce the cost (e.g., due to the smaller die size required by a demapper) and power consumption required for demapping procedures in mmW deployments.

Further, by applying the same LR across multiple REs, an MMSE-based demapper may spread the computational cost of computing the LR across multiple REs, thus increasing the computational efficiency of performing the MMSE-based demapping process described above. Moreover, the transformation matrix may be generated in such a way that, when the transformation matrix is applied to the channel estimate, cross correlation of columns of a resulting transformed channel estimate may be reduced. Beneficially, the techniques described herein may result in decoding performance based on MMSE demapping that offers nearly the same performance as decoding that is based on ML-based demapping, but with lower computational complexity. Moreover, by applying preprocessing based on LR, MMSE or SIC demappers, both of which may be low cost, may reach the same, or nearly the same, performance as a computation heavy ML demapper.

Aspects of the disclosure are initially described in the context of wireless communications systems. Aspects of the disclosure are then described in the context of a decoding component, an MMSE demapper, an SIC demapper, and a process flow. Aspects of the disclosure are further illustrated by and described with reference to apparatus diagrams, system diagrams, and flowcharts that relate to using lattice reduction for reduced decoder complexity.

FIG. 1 illustrates an example of a wireless communications system 100 that supports using LR for reduced decoder complexity in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, or NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, directional transmissions utilized by a wireless communication system occupy a larger bandwidth to offer high data rates at ultra-low latencies, as compared to non-directional transmissions. Conventional demapping procedures (e.g., maximum-likelihood (ML) demapping procedures) require highly-complex calculations to be performed by a UE 115 on every RE included in a transmission. As the number of REs included in a transmission increases (as is the case in mmW systems), the computational-cost of performing ML-based demapping procedures, and the associated silicon die size, greatly increases, resulting in high power usage at a UE 115.

The techniques described herein provide for UE 115 to apply LR techniques for generating a transformation matrix that can be reused over a set of resource elements to reduce computational complexity for demapping and decoding of symbols of a received beamformed transmission. In an example, UE 115 may determine a channel estimate of an RE over a set of REs over which a beamformed channel transmission is received and determine an initial lattice domain corresponding to the channel estimate. The initial lattice domain may be a set of constellation symbols that correspond to the unique bit sequences that may be represented by a beamformed transmission across an RE, and the initial lattice domain may include an amplitude and phase vector representation of a received beamformed transmission across the RE.

The UE 115 may apply an LR calculation to the channel estimate to determine a transformation matrix, and may apply the transformation matrix to the channel estimate to calculate a transformed channel matrix. The transformation matrix may reduce the correlation between the columns of the transformed channel estimate, and the transformed channel estimate may correspond to a transformed lattice domain. The transformed lattice domain may include a set of transformed constellation symbols, where each transformed constellation symbol corresponds to a constellation symbol. Further, the transformed lattice domain may include a transformed vector that corresponds to the vector of the initial lattice domain. The UE 115 may perform MMSE distance calculations between each transformed constellation symbol and the transformed vector, which may allow the UE 115 to determine the set of constellation symbols that have the smallest distance to the transformed vector in the transformed lattice domain. In some cases, the UE may apply similar techniques and perform SIC-based demapping, instead of MMSE-based demapping.

The UE 115 may then perform MMSE distance calculations between the subset of constellation symbols that correspond to the subset of transformed constellation symbols that have the smallest distance to the transformed vector and the vector in the initial lattice domain. The UE 115 may use these MMSE distance calculations in the initial lattice domain to determine an LLR for each symbol of a received beamformed transmission. The UE 115 may use the LLR(s) to determine a bit sequence, and perform an error detection procedure on the bit sequence to determine whether the beamformed transmission was successfully received. When the UE 115 receives multiple symbols on a scheduled RE (e.g., on multiple spatial layers), an MMSE-based demapper may repeat the demapping procedure described above for each symbol on the scheduled RE in each layer.

Because beamformed transmissions are robust against time dispersion, channel conditions may not significantly vary from one RE to another. Further, transmission delay and Doppler spread may be limited such that an MMSE-based demapper may apply the same LR to the channel estimates of multiple REs across the frequency domain and the time domain. By applying an LR calculation to the channel estimate of an RE, an MMSE-based demapper may be able to utilize MMSE-based demapping techniques, which may be less computationally complex than an ML-based demapping technique, while providing a similar performance as an ML-based demapping technique. Further, by applying the same LR across multiple REs, an MMSE-based demapper may spread the computational cost of computing the transformation matrix across multiple REs, thus increasing the computational efficiency of performing the MMSE-based demapping process described above.

Figure 2:
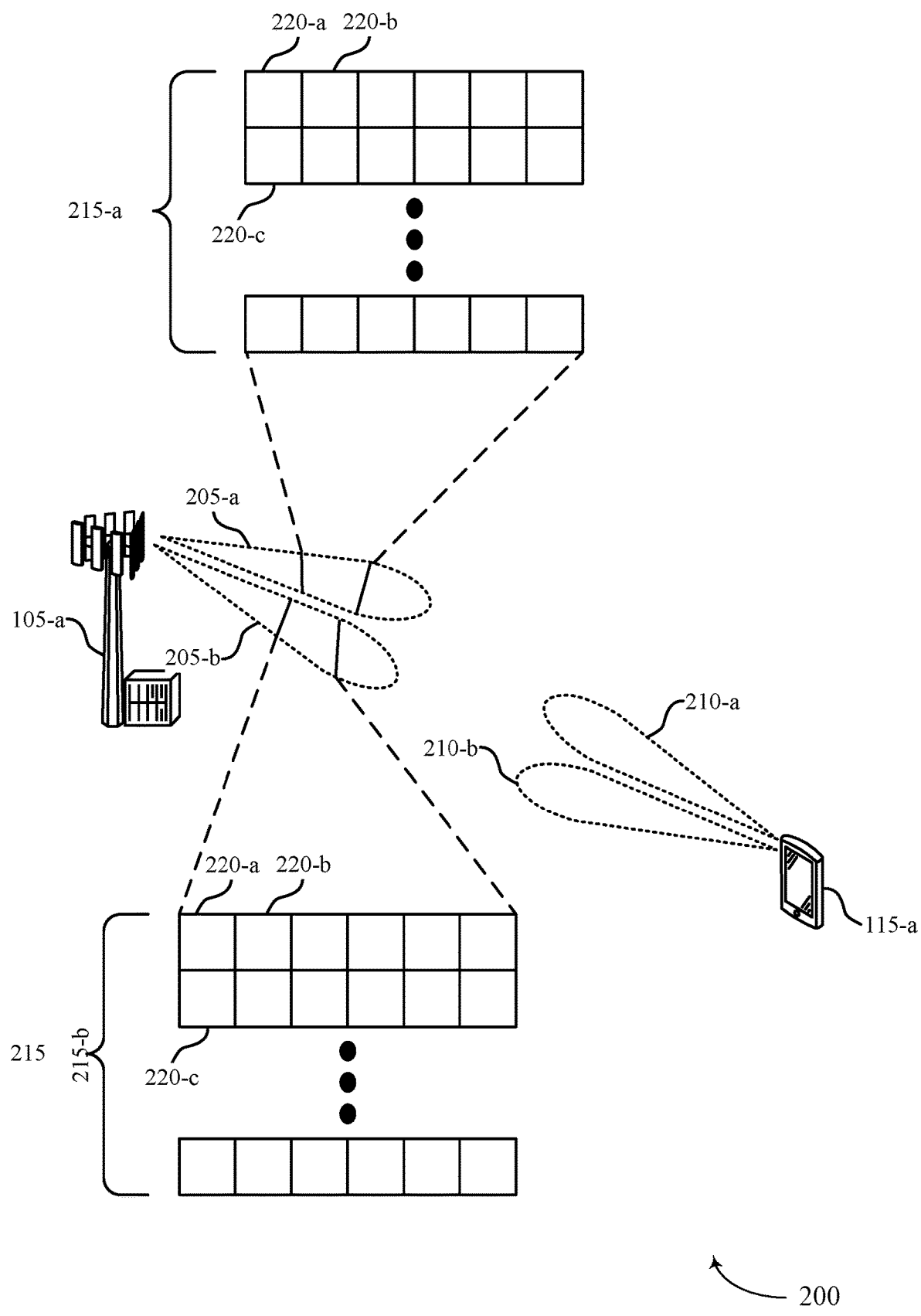

FIG. 2 illustrates an example of a wireless communications system 200 that supports using LR for reduced decoder complexity in accordance with aspects of the present disclosure. In some examples, wireless communications system 200 may implement aspects of wireless communications system 100. For example, wireless communications system 200 includes base station 105-a, and UE 115-a, which may be examples of base stations 105 and UEs 115 described with reference to FIG. 1.

Wireless communications system 200 may operate in frequency ranges that are associated with beamformed transmissions between base station 105-a and UE 115-a. For example, wireless communications system 200 may operate using mmW frequency ranges. As a result, signal processing techniques, such as beamforming, may be used to coherently combine energy and overcome path loss. For example, base station 105-a and the UEs 115 may communicate via beam pair links (BPLs), each BPL including, for example, a transmit beam 205 of base station 105-a (e.g., transmit beams 205-a and 205-b) and a receive beam 210 of UE 115-a (e.g., receive beams 210-a and 210-b). It is understood that the respective devices are capable of forming directional beams for transmission and reception, where base station 105-a may also form one or more receive beams for receiving on the uplink, and UE 115-a may form corresponding transmit beams to transmit signals to base station 105-a. In some cases, base station 105-a may only have the capacity to utilize a single transmit beam 205 at a time (e.g., during a TTI), and UE 115-a may receive directional transmissions from base station 105-a when monitoring the path of a transmit beam 205 (e.g., in a particular direction).

In some cases, base station 105-a may transmit a configuration message to UE 115-a, where the configuration message indicates the number of spatial layers 215 and a modulation and coding scheme (MCS) that base station 105-a may utilize for a set of beamformed transmissions. In some cases, an MCS may indicate the coding rate associated with a transmitted set of beamformed transmissions. Base station 105-a may transmit to UE 115-a, the set of beamformed transmissions in accordance with the configuration message (e.g., base station 105-a may transmit the set of beamformed transmissions using the MCS and number of spatial layers 215 indicated in the configuration message). In some cases, base station 105-a may transmit one spatial layer 215 per transmit beam 205. For example, base station 105-a may utilize transmit beam 205-a to transmit spatial layer 215-a and utilize transmit beam 205-b to transmit spatial layer 215-b.

Each spatial layer 215 may be transmitted on a set of REs 220, where an RE 220 corresponds to one sub-carrier (or tone or subchannel) in the frequency domain and one symbol in the time domain. Base station 105-a may transmit a modulated signal on an RE 220 such that the modulated signal corresponds to a bit sequence as defined by the MCS indicated by base station 105-a. For example, base station 105-a may utilize a 16 quadrature amplitude modulation (QAM) MCS such that base station 105-a may apply one of sixteen unique amplitude and phase modulations to a beamformed transmission on an RE 220, where each unique amplitude and phase modulation corresponds to a unique 4-bit bit sequence. Thus, by utilizing a 16 QAM MCS, base station 105-a may transmit one of sixteen unique bit sequences to UE 115-a per RE 220. In another example, base station 105-a may utilize a 64 QAM MCS such that base station 105-a may apply one of sixty-four unique amplitude and phase modulations to a beamformed transmission on an RE 220, where each unique amplitude and phase modulation corresponds to a unique 6-bit bit sequence. Thus, by utilizing a 64 QAM MCS, base station 105-a may transmit one of sixty-four unique bit sequences to UE 115-a per RE 220.

Because transmit beams 205 may be directional transmissions, multiple transmit beams 205 may utilize the same time-frequency resources (e.g., the same set of REs 220) with limited interference between the transmit beams 205. For example, base station 105-a may transmit spatial layer 215-a on transmit beam 205-a across the same time-frequency resources as the transmission of spatial layer 215-a on transmit beam 205-b. In such a case, UE 115-a may receive multiple modulated signals corresponding to different spatial layers 215 on the same RE 220. For example, base station 105-a may transmit, and UE 115-a may receive, both a first modulated signal on spatial layer 215-a and a second modulated signal on spatial layer 215-b on RE 220-a, both a third modulated signal on spatial layer 215-a and a fourth modulated signal on spatial layer 215-b on RE 220-b, and both a fifth modulated signal on spatial layer 215-a and a sixth modulated signal on spatial layer 215-b on RE 220-c.

Upon receiving spatial layers 215, UE 115-a may perform demapping and decoding procedures on each RE 220.

Because base station 105-*a* may transmit downlink signals according to an MCS, UE 115-*a* may perform a demapping procedure to estimate the bit sequence represented by each downlink signal, and UE 115-*a* may perform a decoding procedure to detect errors in the downlink transmissions. In some cases, UE 115-*a* may utilize a maximum likelihood (ML) demapping procedure, which may be a complex and computationally-costly demapping procedure. In some cases, UE 115-*a* may utilize per-stream recursive demapping (PSRD), which is a near-ML approach for decoding spatial multiplexing transmissions. PSRD, however, consumes a lot of power and die size due to very large bandwidths associated with mmW. In some cases, UE 115-*a* may utilize a minimum mean square error (MMSE) demapping procedure after performing a lattice reduction (LR) on a channel estimate of a given RE 220. An MMSE demapping procedure may be less complex than an ML procedure and hence may reduce computational costs at UE 115-*a* when performing a demapping procedure.

In some cases, UE 115-*a* may perform a successive interference cancellation (SIC) demapping procedure after performing an LR and a QR decomposition on a channel estimate of a given RE 220. An SIC demapping procedure may be less complex than an ML procedure, which reduces computational costs at UE 115-*a* when performing a demapping procedure.

Further, because mmW systems may be less time dispersive than other wireless communications systems, and because UE 115-*a* may infrequently change location, channel conditions may not significantly vary from one RE 220 to the next (e.g., due to delay and/or Doppler spread). In such a case, UE 115-*a* may apply the LR determined for a first RE 220 to determine a transformation matrix that may be applied to one or more other REs 220 in which a beamformed transmission is transmitted across frequency and/or time resources, thereby spreading the computational cost of performing an LR to calculating the transformation matrix across multiple REs.

For example, UE 115-*a* may apply an LR calculation to the channel estimate of RE 220-*a* to generate a transformation matrix, where other REs may share the transformation matrix for demapping. UE 115-*a* may determine that the time delay from RE 220-*a* to RE 220-*b* may be less than a threshold, so UE 115-*a* may apply the transformation matrix to the channel estimate of RE 220-*b*. Further, UE 115-*a* may determine that the Doppler spread from RE 220-*a* to RE 220-*b* may be below a threshold, so UE 115-*a* may apply the transformation matrix to the channel estimate of RE 220-*b*. In such a case, UE 115-*a* may save the computational costs of determining unique LRs for each of REs 220-*a*, 220-*b*, and 220-*c*, which may save computational costs at UE 115-*a*. Further, by applying the LR to the channel estimates of REs 220-*a*, 220-*b*, and 220-*c*, UE 115-*a* may perform an MMSE demapping procedure for each of REs 220-*a*, 220-*b*, and 220-*c*, which may be a relatively low-cost demapping procedure, further resulting in reduced complexity and computational cost at UE 115-*a*.

Figure 3:
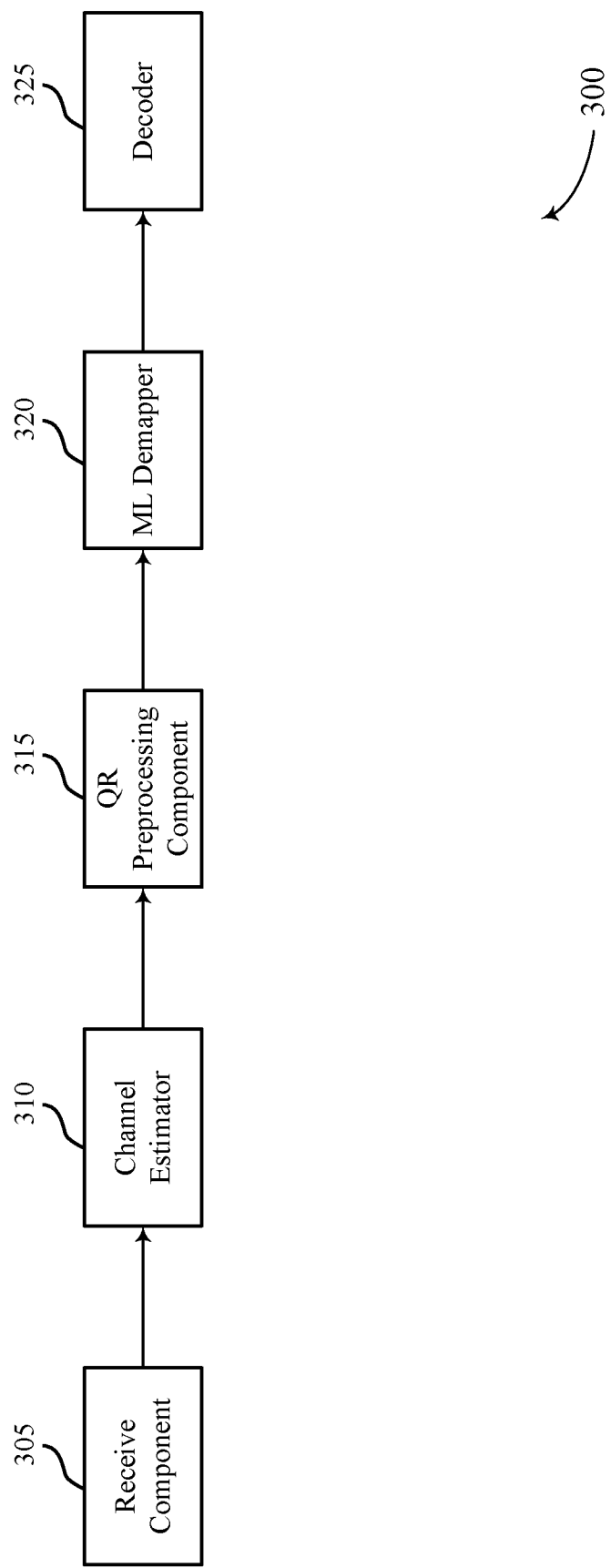
FIG. 3 illustrates an example of a decoding component in accordance with aspects of the present disclosure.

FIG. 3 illustrates an example of a decoding component 300 that supports using LR for reduced demapper complexity in accordance with aspects of the present disclosure. In some examples, decoding component 300 may implement aspects of wireless communications systems 100 and 200.

As described with reference to FIG. 2, decoding component 300 may receive one or more beamformed transmissions on a scheduled RE at receive component 305. In some cases, the beamformed transmissions may correspond to one or more modulated signals received on the scheduled RE. Receive component 305 may produce matrix Y, where Y is defined according to Equation 1 below:

$$Y = H \cdot S + N \quad (1)$$

where H is the matrix representation of the channel on the scheduled RE over which the beamformed transmissions are received, S is the input matrix, and N is the thermal noise across the channel on the scheduled RE over which the beamformed transmissions are received. Y may be the matrix representation of the beamformed transmissions received on the scheduled RE. Matrices Y, H, S, and N may each be in the frequency domain per sub-carrier (e.g., or tone).

Receive component 305 may pass matrix Y to channel estimator 310, where channel estimator 310 may determine matrix H (e.g., by performing a channel estimate procedure) for the RE over which the beamformed transmissions are received. Matrix H may correspond to a lattice domain that may include a set of constellation symbols. Each constellation symbol may have a defined amplitude and phase of a set of amplitudes and phrases within a modulation scheme (e.g., QPSK, 16-QAM, 64-QAM) used for modulating symbols of the beamformed transmission. Each constellation symbol may correspond to a unique bit sequence that may be represented by a modulated signal received by decoding component 300.

The lattice domain may include a vector representation of an amplitude and phase vector of Y for the received beamformed transmission. Channel estimator 310 may then pass matrices Y and H to QR preprocessing component 315. QR preprocessing component 315 may perform a QR decomposition on matrix Y to produce an orthogonal (Q) matrix and a triangular (R) matrix representation of Y. QR preprocessing component 315 may then pass matrices Q, R, Y, and H to ML demapper 320. ML demapper 320 may calculate the distances between the vector representation of matrix Y and each constellation symbol of the lattice domain.

ML demapper 320 may pass the calculated distances to decoder 325. Decoder 325 may determine a logarithmic-likelihood ratio (LLR) of the received modulated signal based on the calculated distances. The decoder 325 may determine a bit sequence from the LLR(s) and perform error detection on the bit sequence (e.g., a cyclic redundancy check (CRC)) to determine if the bit sequence passed error detection.

As described above with reference to FIG. 2, receive component 305 may receive beamformed transmissions corresponding to multiple spatial layers on the same RE. In such a case, decoding component 300 may perform demapping and decoding procedures as described above for each modulated symbol received on an RE. In the case that beamformed transmissions (e.g., physical downlink shared channel (PDSCH) transmissions) are transmitted on two layers according to a 64 QAM MCS with a high coding rate (e.g., six gigabits per second), ML demapper 320 may perform 128 total distance calculations (64 distance calculations between a received symbol and each of the 64 constellation symbols per spatial layer) per RE over which beamformed transmissions are received. In such a case, ML-based demapping techniques may be computationally costly at a decoding component 300.

Figure 4:
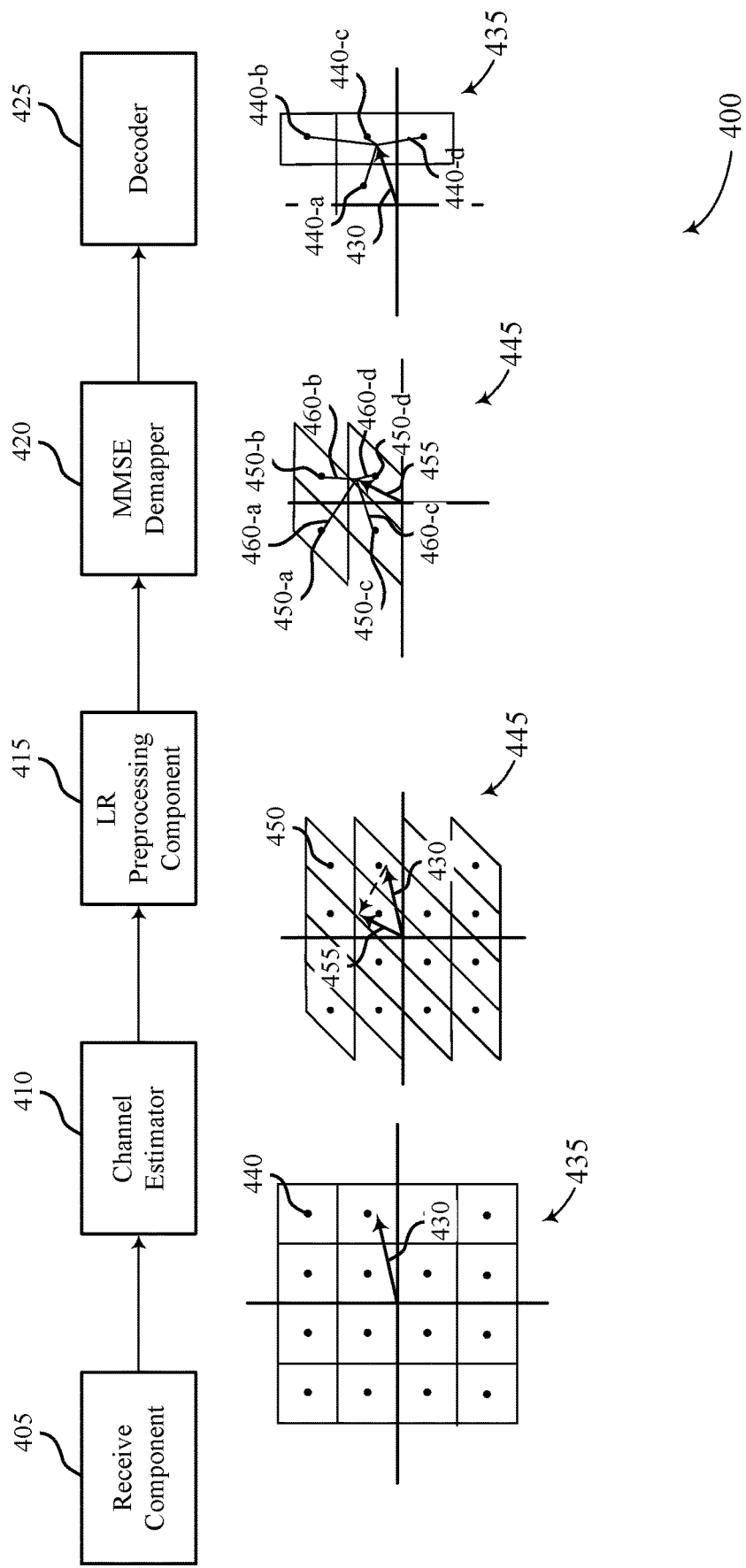
FIG. 4 illustrates an example of a minimum mean square error (MMSE) demapper in accordance with aspects of the present disclosure.

FIG. 4 illustrates an example of a MMSE decoder 400 that supports using LR for reduced demapper complexity in accordance with aspects of the present disclosure. In some examples, MMSE decoder 400 may implement aspects of wireless communications systems 100 and 200. MMSE decoder 400 may include receive component 405, channel estimator 410, LR preprocessing component 415, MMSE demapper 420, and decoder 425.

As described with reference to FIG. 2, MMSE decoder 400 may receive one or more beamformed transmissions on a scheduled RE at receive component 405. In some cases, the beamformed transmissions may correspond to one or more symbols (e.g., one or more modulated signals) received on the scheduled RE. Receive component 405 may produce matrix Y, where matrix Y is defined according to Equation 1 above. Output matrix Y may include a set of vectors 430, where each vector 430 may correspond to the amplitude and phase vector of one symbol received on the scheduled RE.

Channel estimator 410 may determine matrix H, where matrix H is the matrix representation of the channel on the scheduled RE over which the beamformed transmissions are received. Matrix H may correspond to initial lattice domain 435. Initial lattice domain 435 may include a set of constellation symbols 440. Each constellation symbol 440 may have a defined amplitude and phase of a set of amplitudes and phrases within a modulation scheme (e.g., QPSK, 16-QAM, 64-QAM) used for modulating symbols of the beamformed transmission. Further, each constellation symbol 440 may correspond to a unique bit sequence that may be represented by a symbol received by MMSE decoder 400.

For example, a base station 105 may transmit beamformed transmissions according to a 16 QAM MCS such that initial lattice domain 435 may include sixteen constellation symbols 440. In such a case, each constellation symbol 440 may correspond to one of the sixteen unique bit sequences that may be represented by a transmitted symbol. In the cases when a base station 105 transmits beamformed transmissions according to a 64 QAM MCS, initial lattice domain 435 may include sixty-four constellation symbols 440 such that each constellation symbol 440 may correspond to one of the sixty-four unique bit sequences that may be represented by a transmitted symbol.

In an example, initial lattice domain 435 may include one or more vectors 430. A vector 430 may be a representation of the amplitude and phase vector of a symbol received at receive component 405 on the scheduled RE. When multiple symbols are received at receive component 405 on a scheduled RE, initial lattice domain 435 will include a unique vector 430 corresponding to each received symbol. For example, when receive component 405 receives two symbols (each symbol corresponding to a different spatial layer) on a scheduled RE, initial lattice domain 435 may include two vectors 430. Channel estimator 410 may determine matrix H (e.g., and initial lattice domain 435) once per scheduled RE.

Channel estimator 410 may pass matrices Y and H to LR preprocessing component 415. LR preprocessing component 415 may perform an LR calculation on matrices Y and H to determine transformation matrix T. LR preprocessing component 415 may calculate transformation T once per sub-carrier. In some cases, LR preprocessing component 415 may calculate transformation matrix T with, for example, up to very high decimation in time and frequency due to the stationarity of 5G NR channels in time and frequency. Transformation matrix T may include real and integer numbers. LR preprocessing component 415 may determine transformation matrix T based on a column correlation criterion (e.g., correlation between columns that satisfies a threshold, which may be than or equal to the threshold) between H and matrix $\tilde{H}$ (e.g., such that transformation matrix T reduces the correlation between the columns of matrix $\tilde{H}$), where matrix $\tilde{H}$ is defined according to Equation 2 below:

$$\tilde{H}=H \cdot T \quad (2)$$

Accordingly, matrix $\tilde{H}$ may correspond to transformed lattice domain 445. Transformed lattice domain 445 may include a set of transformed constellation symbols 450, where each transformed constellation symbol 450 may correspond to a constellation symbol 440. Further, transformed lattice domain 445 may include one or more transformed vectors 455, where each transformed vector 455 may correspond to a vector 430 and may be defined according to the LR performed by LR preprocessing component 415. Due to the LR determined by LR preprocessing component 415, transformed vector 455 may have different amplitude and phase coordinates within transformed lattice domain 445 than its corresponding vector 430.

LR preprocessing component 415 may output matrices H, Y, and T to MMSE demapper 420. MMSE demapper 420 may perform an MMSE distance calculation on each symbol pair of transformed lattice domain 445. In initial lattice domain 435, a symbol pair may include the symbol represented by a vector 430 and a constellation symbol 440, and in transformed lattice domain 445 a symbol pair may include the symbol represented by a transformed vector 455 and a transformed constellation symbol 450. Thus, the set of symbol pairs in initial lattice domain 435 may include symbol pairs that correspond to each constellation symbol 440, and the set of symbol pairs in transformed lattice domain 445 may include symbol pairs that correspond to each transformed constellation symbol 450. A symbol pair in initial lattice domain 435 may correspond to a symbol pair in transformed lattice domain 445. Transformed vector 455 may be defined according to Equation 3 below:

$$Y=H \cdot T \cdot (T^{-1} \cdot S)+N \quad (3)$$

Based on the determined MMSE distance calculations, MMSE demapper 420 may identify a subset of N symbol pairs in transformed lattice domain 445 that have the smallest MMSE distance measurements. In some cases, MMSE demapper 420 may select a list size of the closest symbol pairs (e.g., select list size number N pairs of symbols, where N is a positive integer) based on the determined MMSE distance calculations such that each selected symbol pair of the N symbol pairs may have a shorter MMSE distance measurement than any unselected symbol pair of the set of symbol pairs.

For example, MMSE demapper 420 may perform an MMSE distance calculation for each symbol pair in transformed lattice domain 445 (e.g., MMSE demapper 420 may perform an MMSE distance calculation between each transformed constellation symbol 450 of transformed lattice domain 445 and transformed vector 455). In the case when transformed lattice domain 445 correspond to a 16 QAM MCS, MMSE demapper 420 may perform sixteen MMSE distance calculations per symbol received in an RE. In the case when transformed lattice domain 445 correspond to a 64 QAM MCS, MMSE demapper 420 may perform sixty-four MMSE distance calculations per symbol received in an RE. After performing the MMSE distance calculations, MMSE demapper 420 may determine the four (e.g., when N=4) symbol pairs in transformed lattice domain 445 that have the smallest MMSE distance measurements.

For example, MMSE demapper 420 may determine that distance 460-a between transformed constellation symbol 450-a and transformed vector 455, distance 460-b between transformed constellation symbol 450-*b* and transformed vector 455, distance 460-*c* between transformed constellation symbol 450-*c* and transformed vector 455, and distance 460-*d* between transformed constellation symbol 450-*d* and transformed vector 455 are the four shortest distances 460 (e.g., when N=4) between transformed constellation symbols 450 and transformed vector 455. MMSE demapper 420 may select the symbol pairs associated with transformed constellation symbols 450-*a*, 450-*b*, 450-*c*, and 450-*d* to comprise the list of symbol pairs associated with the smallest MMSE distance calculations in transformed lattice domain 445.

Upon determining the list of symbol pairs associated with the smallest MMSE distance calculations in transformed lattice domain 445, MMSE demapper 420 may identify the constellation symbols 440 in initial lattice domain 435 that correspond to the transformed constellation symbols 450 associated with the N symbol pairs that have the smallest MMSE distance calculations in transformed lattice domain 445. MMSE demapper 420 may then calculate the MMSE distances for each symbol pair corresponding to the identified constellation symbols 440 in initial lattice domain 435 (e.g., MMSE demapper 420 may calculate the MMSE distances between the constellation symbols 440 in initial lattice domain 435 corresponding to the selected symbol pairs in transformed lattice domain 445 and vector 430).

For example, MMSE demapper 420 may identify that constellation symbol 440-a in initial lattice domain 435 corresponds to transformed constellation symbol 450-*a*, that constellation symbol 440-*b* in initial lattice domain 435 corresponds to transformed constellation symbol 450-*b*, that constellation symbol 440-*c* in initial lattice domain 435 corresponds to transformed constellation symbol 450-*c*, and that constellation symbol 440-*d* in initial lattice domain 435 corresponds to transformed constellation symbol 450-*d*. Accordingly, MMSE demapper 420 may perform an MMSE distance calculation between constellation symbol 440-*a* and vector 430, perform an MMSE distance calculation between constellation symbol 440-*b* and vector 430, perform an MMSE distance calculation between constellation symbol 440-*c* and vector 430, and perform an MMSE distance calculation between constellation symbol 440-*d* and vector 430.

MMSE demapper 420 may pass the calculated MMSE distances to decoder 425. Based on these MMSE distance calculations in initial lattice domain 435, decoder 425 may determine an LLR for the symbol represented by vector 430. Decoder 425 may utilize the LLR to determine a received bit sequence of the symbol represented by vector 430 and may perform an error detection procedure (e.g., a CR)) on the received bit sequence. Upon determining that the determined LLR passes the error detection procedure, decoder 425 may generate acknowledgement (ACK) feedback to transmit to the base station. Upon determining that the determined LLR fails the error detection procedure, decoder 425 may generate negative-acknowledgement (NACK) feedback to transmit to the base station.

As described above, vector 430 may be a representation of the amplitude and phase vector of one symbol received at receive component 405 on a scheduled RE. When receive component 405 receives multiple symbols on a scheduled RE (e.g., on multiple spatial layers), MMSE decoder 400 may repeat the demapping procedure described above for each symbol on the scheduled RE. However, because beamformed transmissions are robust against time dispersion, channel conditions may not significantly vary from one RE to another.

Further, transmission delay and Doppler spread may be limited such that MMSE decoder 400 may apply the same transformation matrix T (e.g., based on an LR calculation) to the channel estimates of multiple REs across the frequency domain and the time domain such that MMSE decoder 400 may decode the one or more symbols of the multiple REs according to LR-based MMSE demapping techniques. By applying an LR-based transformation matrix T to the channel estimate of an RE, MMSE decoder 400 may be able to utilize MMSE-based demapping techniques, which may be less computationally complex than an ML-based demapping technique. Further, by applying the same transformation matrix T across multiple REs, MMSE decoder 400 may spread the computational cost of computing the transformation matrix T across multiple REs, thus increasing the computational efficiency of performing the MMSE-based demapping process described above.

For example, a base station 105 may transmit beamformed transmissions (e.g., PDSCH transmissions) according to a 2-spatial layer, 64 QAM (e.g., having a high coding rate such as 6 gigabits per second or higher) MCS. In such a case, an ML-based demapping procedure may require a UE 115 to perform 128 ML-based distance calculations (i.e., sixty-four ML-based distance calculations between a received symbol and each of the 64 constellation symbols per spatial layer), where the ML-based distance calculations may be computationally-complex. When utilizing an LR-aided MMSE-based demapper in such an MCS, the number of MMSE distance calculations may be reduced to 32 (e.g., when N is selected to be 16). Because the number of distance calculations (e.g., calculated on a subset of symbol pairs) performed by a demapper is one of the main contributors to the complexity and cost (e.g., power cost and die size) of a demapper, decreasing the number of distance calculations from 128 (e.g., in the case of the ML-based demapper) to 32 (e.g., in the case of the MMSE-based demapper) may greatly reduce the complexity and cost of demapping such a beamformed transmission without significantly lowering the performance of the demapper. Further, a UE 115 may determine a channel property (e.g., delay or Doppler spread) associated with the beamformed transmissions.

The UE 115 may identify a number of REs associated with the beamformed transmissions on which to apply the transformation matrix based on the channel property. In some cases, the number of REs corresponds to a number of different sub-carriers in a same symbol period. In some cases, the number of REs corresponds to a number of sub-carriers located in a plurality of different symbol periods. The UE 115 may then apply the same LR-based transformation matrix T to the identified REs across frequency and/or time resources to decode the one or more symbols received on the identified REs, which may amortize the cost of calculating the transformation matrix T across the multiple REs as the cost of calculating transformation matrix T (e.g., based on an LR calculation) may be shared by many sub-carriers across frequency resources and time resources.

Figure 5:
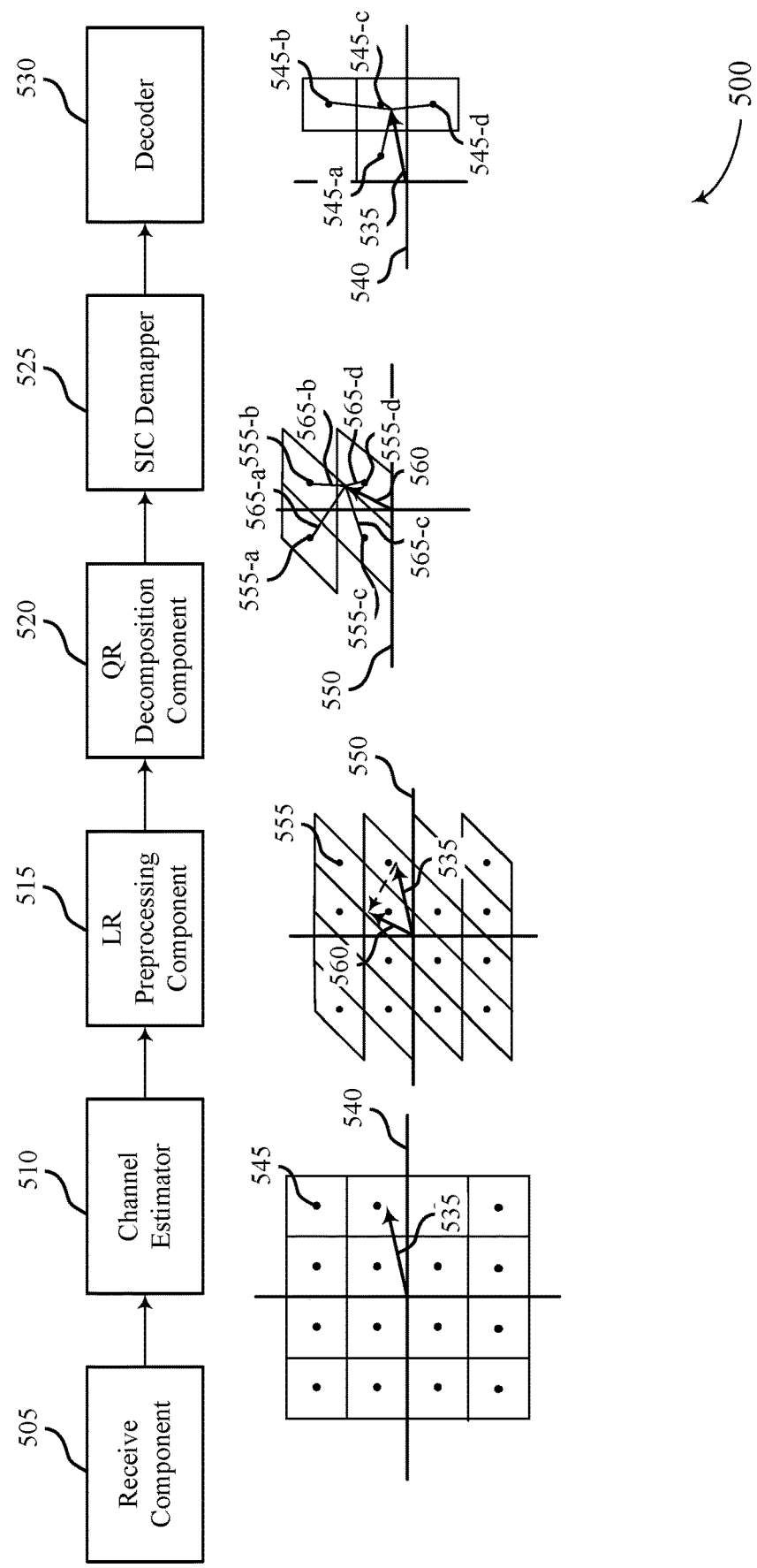
FIG. 5 illustrates an example of a successive interference cancellation (SIC) decoder in accordance with aspects of the present disclosure.

FIG. 5 illustrates an example of a SIC decoder 500 that supports using LR for reduced demapper complexity in accordance with aspects of the present disclosure. In some examples, SIC decoder 500 may implement aspects of wireless communications systems 100 and 200. SIC decoder 500 may include receive component 505, channel estimator 510, LR preprocessing component 515, QR decomposition component 520, successive SIC demapper 525, and decoder 530.

As described with reference to FIG. 2, SIC decoder 500 may receive one or more beamformed transmissions on a scheduled RE at receive component 505. In some cases, the beamformed transmissions may correspond to one or more symbols (e.g., one or more modulated signals) received on the scheduled RE. Receive component 505 may produce output matrix Y, where matrix Y is defined according to Equation 1 above. Output matrix Y may include a set of vectors 535, where each vector 535 may correspond to the amplitude and phase vector of one symbol received on the scheduled RE.

Channel estimator 510 may determine matrix H, where matrix H is the matrix representation of the channel on the scheduled RE over which the beamformed transmissions are received. H may correspond to initial lattice domain 540. Initial lattice domain 540 may include a set of constellation symbols 545. Each constellation symbol 545 may have a defined amplitude and phase of a set of amplitudes and phrases within a modulation scheme (e.g., QPSK, 16-QAM, 64-QAM) used for modulating symbols of the beamformed transmission. Further, each constellation symbol 545 may correspond to a unique bit sequence that may be represented by a symbol received by SIC decoder 500.

For example, a base station 105 may transmit beamformed transmissions according to a 16 QAM MCS such that initial lattice domain 540 may include sixteen constellation symbols 545. In such a case, each constellation symbol 545 may correspond to one of the sixteen unique bit sequences that may be represented by a transmitted symbol. In the case when a base station 105 transmits beamformed transmissions according to a 64 QAM MCS, initial lattice domain 540 may include sixty-four constellation symbols 545 such that each constellation symbol 545 may correspond to one of the sixty-four unique bit sequences that may be represented by a transmitted symbol.

Further, initial lattice domain 540 may include one or more vectors 535. A vector 535 may be a representation of the amplitude and phase vector of a symbol received at receive component 505 on the scheduled RE. When multiple symbols are received at receive component 505 on a scheduled RE, initial lattice domain 540 will include a unique vector 535 corresponding to each received symbol. For example, when receive component 505 receives two symbols (e.g., each symbol corresponding to a different spatial layer) on a scheduled RE, initial lattice domain 540 may include two vectors 535. Channel estimator 510 may determine matrix H (e.g., and initial lattice domain 540) once per scheduled RE.

Channel estimator 510 may pass matrices Y and H to LR preprocessing component 515. LR preprocessing component 515 may perform an LR calculation on matrices Y and H to determine transformation matrix T. LR preprocessing component 515 may calculate transformation T once per sub-carrier. In some cases, LR preprocessing component 515 may calculate transformation matrix T with very high decimation in time and frequency due to the stationarity of 5G NR channels in time and frequency. Transformation matrix T may include real and integer numbers. LR preprocessing component 515 may determine transformation matrix T based on a column correlation criterion for matrix $\tilde{H}$ (e.g., such that transformation matrix T reduces the correlation between the columns of matrices H and $\tilde{H}$), where matrix $\tilde{H}$ is defined according to Equation 2 above.

Accordingly, matrix $\tilde{H}$ may correspond to transformed lattice domain 550. Transformed lattice domain 550 may include a set of transformed constellation symbols 555, where each transformed constellation symbol 555 may correspond to a constellation symbol 545. Further, transformed lattice domain 550 may include one or more transformed vectors 560, where each transformed vector 560 may correspond to a vector 535 and may be defined according to the LR performed by LR preprocessing component 515. Due to the LR determined by LR preprocessing component 515, transformed vector 560 may have different amplitude and phase coordinates within transformed lattice domain 550 than its corresponding vector 535.

LR preprocessing component 515 may output matrices H, Y, and T to QR decomposition component 520. QR decomposition component 520 may perform a QR decomposition on matrix $\tilde{H}$ to produce product of a Q matrix and an R matrix. QR decomposition component may pass the Q, R, Y, and H matrices to SIC demapper 525.

SIC demapper 525 may perform an SIC distance calculation on each symbol pair of transformed lattice domain 550. In initial lattice domain 540 a symbol pair may include the symbol represented by a vector 535 and a constellation symbol 545, and in transformed lattice domain 550 a symbol pair may include the symbol represented by a transformed vector 560 and a transformed constellation symbol 555. Thus, the set of symbol pairs in initial lattice domain 540 may include symbol pairs that correspond to each constellation symbol 545, and the set of symbol pairs in transformed lattice domain 550 may include symbol pairs that correspond to each transformed constellation symbol 555. A symbol pair in initial lattice domain 540 may correspond to a symbol pair in transformed lattice domain 550.

Transformed vector 560 may be defined according to Equation 3 above. Based on the determined SIC distance calculations, SIC demapper 525 may identify a subset of N symbol pairs in transformed lattice domain 550 that have the smallest SIC distance measurements. In some cases, SIC demapper 525 may select a list size of the closest symbol pairs (e.g., the value of N) based on the determined SIC distance calculations such that each selected symbol pair of the N symbol pairs may have a shorter SIC distance measurement than any unselected symbol pair of the set of symbol pairs.

For example, SIC demapper 525 may perform an SIC distance calculation for each symbol pair in transformed lattice domain 550 (e.g., SIC demapper 525 may perform an SIC distance calculation between each transformed constellation symbol 555 of transformed lattice domain 550 and transformed vector 560). In the case when transformed lattice domain 550 correspond to a 16 QAM MCS, SIC demapper 525 may perform sixteen SIC distance calculations per symbol received in an RE. In the case when transformed lattice domain 550 corresponds to a 64 QAM MCS, SIC demapper 525 may perform sixty-four SIC distance calculations per symbol received in an RE. After performing the SIC distance calculations, SIC demapper 525 may determine the four (e.g., when N=4) symbol pairs in transformed lattice domain 550 that have the smallest SIC distance measurements.

For example, SIC demapper 525 may determine that distance 565-*a* between transformed constellation symbol 555-*a* and transformed vector 560, distance 565-*b* between transformed constellation symbol 555-*b* and transformed vector 560, distance 565-*c* between transformed constellation symbol 555-*c* and transformed vector 560, and distance 565-*d* between transformed constellation symbol 555-*d* and transformed vector 560 are the four shortest distances 565 (e.g., when N=4) between transformed constellation symbols 555 and transformed vector 560. SIC demapper 525 may select the symbol pairs associated with transformed constellation symbols 555-*a*, 555-*b*, 555-*c*, and 555-*d* to comprise the list of symbol pairs associated with the smallest SIC distance calculations in transformed lattice domain 550.

Upon determining the list of symbol pairs associated with the smallest SIC distance calculations in transformed lattice domain 550, SIC demapper 525 may identify the constellation symbols 545 in initial lattice domain 540 that correspond to the transformed constellation symbols 555 associated with the N symbol pairs that have the smallest SIC distance calculations in transformed lattice domain 550. SIC demapper 525 may then calculate the SIC distances for each symbol pair corresponding to the identified constellation symbols 545 in initial lattice domain 540 (e.g., SIC demapper 525 may calculate the SIC distances between the constellation symbols 545 in initial lattice domain 540 corresponding to the selected symbol pairs in transformed lattice domain 550 and vector 535).

For example, SIC demapper 525 may identify that constellation symbol 545-*a* in initial lattice domain 540 corresponds to transformed constellation symbol 555-*a*, that constellation symbol 545-*b* in initial lattice domain 540 corresponds to transformed constellation symbol 555-*b*, that constellation symbol 545-*c* in initial lattice domain 540 corresponds to transformed constellation symbol 555-*c*, and that constellation symbol 545-*d* in initial lattice domain 540 corresponds to transformed constellation symbol 555-*d*. Accordingly, SIC demapper 525 may perform an SIC distance calculation between constellation symbol 545-*a* and vector 535, perform an SIC distance calculation between constellation symbol 545-*b* and vector 535, perform an SIC distance calculation between constellation symbol 545-*c* and vector 535, and perform an SIC distance calculation between constellation symbol 545-*d* and vector 535.

SIC demapper 525 may pass the calculated SIC distances to decoder 530. Based on these SIC distance calculations in initial lattice domain 540, decoder 530 may determine an LLR for the symbol represented by vector 535. Decoder 530 may utilize the LLR to determine an estimated bit sequence of the symbol represented by vector 535 and may perform an error detection procedure (e.g., a CRC) on the determined LLR. Upon determining that the determined LLR passes the error detection procedure, decoder 530 may generate ACK feedback to transmit to the base station. Upon determining that the determined LLR fails the error detection procedure, decoder 530 may generate NACK feedback to transmit to the base station.

As described above, vector 535 may be a representation of the amplitude and phase vector of one symbol received at receive component 505 on a scheduled RE. When receive component 505 receives multiple symbols on a scheduled RE (e.g., on multiple spatial layers), SIC decoder 500 may repeat the demapping procedure described above for each symbol on the scheduled RE. However, because beamformed transmissions are robust against time dispersion, channel conditions may not significantly vary from one RE to another. Further, transmission delay and Doppler spread may be within a threshold such that SIC decoder 500 may apply the same transformation matrix T (e.g., based on an LR calculation) to the channel estimates of multiple REs across the frequency domain and the time domain such that SIC decoder 500 may decode the one or more symbols of the multiple REs according to LR-based SIC demapping techniques.

By applying an LR-based transformation matrix T to the channel estimate of an RE, SIC decoder 500 may be able to utilize SIC-based demapping techniques, which may be less computationally complex than an ML-based demapping technique. Further, by applying the same transformation matrix T across multiple REs, SIC decoder 500 may spread the computational cost of computing the transformation matrix T across multiple REs, thus increasing the computational efficiency of performing the SIC-based demapping process described above.

For example, a base station 105 may transmit beamformed transmissions (e.g., PDSCH transmissions) according to a 2-spatial layer, 64 QAM MCS. In such a case, an ML-based demapping procedure may require a UE 115 to perform 128 ML-based distance calculations (i.e., sixty-four ML-based distance calculations between a received symbol and each of the 64 constellation symbols per spatial layer), where the ML-based distance calculations may be computationally-complex. When utilizing an LR-aided SIC-based demapper in such an MCS, the number of SIC distance calculations may be reduced to 32 (e.g., when N is selected to be 16) while providing a similar performance as the ML-based demapper. Because the number of distance calculations (e.g., calculated on a subset of symbol pairs) performed by a demapper is one of the main contributors to the complexity and cost (e.g., power cost and die size) of a demapper, decreasing the number of distance calculations from 128 (e.g., in the case of the ML-based demapper) to 32 (e.g., in the case of the SIC-based demapper) may greatly reduce the complexity and cost of demapping such a beamformed transmission without significantly lowering the performance of the demapper. Further, a UE 115 may determine a channel property (e.g., delay or Doppler spread) associated with the beamformed transmissions.

The UE 115 may identify a number of REs associated with the beamformed transmissions on which to apply the transformation matrix based on the channel property. In some cases, the number of REs corresponds to a number of different sub-carriers in a same symbol period. In some cases, the number of REs corresponds to a number of sub-carriers located in a plurality of different symbol periods. The UE 115 may then apply the same LR-based transformation matrix T to the identified REs across frequency and/or time resources to decode the one or more symbols received on the identified REs, which may amortize the cost of calculating the transformation matrix T across the multiple REs as the cost of calculating transformation matrix T (e.g., based on an LR calculation) may be shared by many sub-carriers across frequency resources and time resources.

Figure 6:
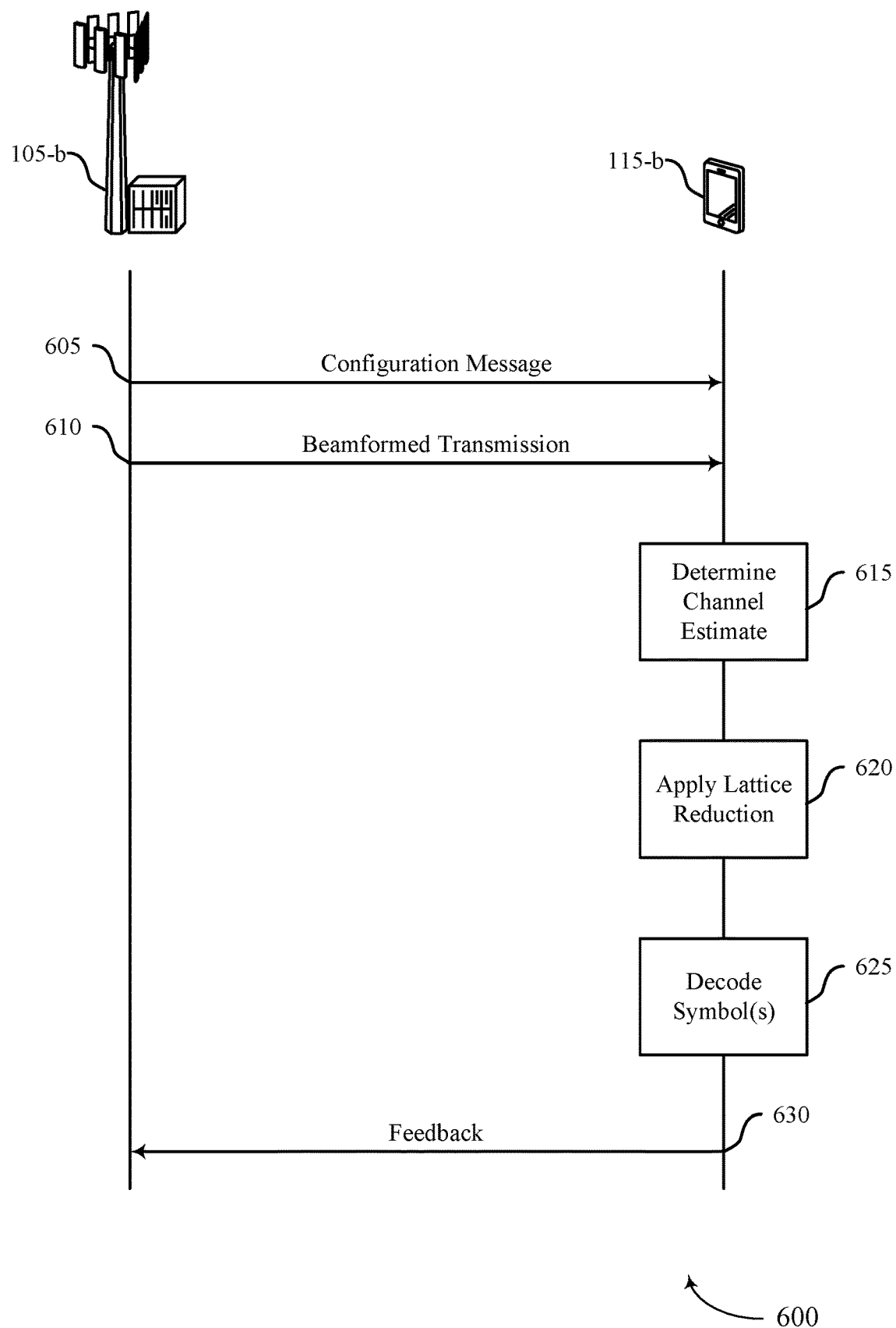
FIG. 6 illustrates an example of a process flow in accordance with aspects of the present disclosure.

FIG. 6 illustrates an example of a process flow 600 that supports using LR for reduced demapper complexity in accordance with aspects of the present disclosure. In some examples, process flow 600 may implement aspects of wireless communications systems 100 and 200. Process flow 600 may include a base station 105-*b* and a UE 115-*b*, which may be example of corresponding base stations 105 and UEs 115, as described above with reference to FIGS. 1-2.

At 605, base station 105-*b* may transmit, and UE 115-*b* may receive, a configuration message indicating a number of spatial layers and a modulation and coding scheme for a beamformed transmission. The configuration message may indicate a defined modulation scheme (e.g., 64 QAM) and a defined coding rate for the beamformed transmission.

At 610, base station 105-*b* may transmit, and UE 115-*b* may receive, the beamformed transmission in accordance with the configuration message. At 615, UE 115-*b* may determine a channel estimate for a resource element in which a first symbol of the beamformed transmission is received.

At 620, UE 115-*b* may apply LR to the channel estimate to determine a transformation matrix. UE 115-*b* may determine the transformation matrix based on a column correlation criterion. The transformation matrix may include real and integer numbers.

UE 115-*b* may apply the transformation matrix to an initial lattice domain to determine a transformed lattice domain. The initial lattice domain may comprise a plurality of constellation symbols and the transformed lattice domain comprising a plurality of transformed constellation symbols. UE 115-*b* may determine, in the transformed lattice domain, a first plurality of distance measurements between a plurality of symbol pairs, each symbol pair of the plurality of symbol pairs including the first symbol and a respective transformed constellation symbol of the plurality of transformed constellation symbols.

UE 115-*b* may identify a subset of the plurality of symbols pairs based on the first plurality of distance measurements. In some cases, UE 115-*b* may select a list size number of the plurality of symbol pairs based on the first plurality of distance measurements, each selected symbol pair of the plurality of symbol pairs having a shorter distance measurement than any unselected symbol pair of the plurality of symbol pairs.

In some examples, UE 115-*b* may identify a subset of a plurality of constellation symbols of the initial lattice domain that correspond to a subset of the plurality of transformed constellation symbols included within the subset of the plurality of symbols pairs. UE 115-*b* may then determine, in the initial lattice domain, a second plurality of distance measurements between the first symbol and a respective constellation symbol within the subset of the plurality of constellation symbols. UE 115-*b* may determine an LLR for the first symbol based on the second plurality of distance measurements, where the first symbol is decoded based at least in part of the LLR. In some cases, each distance measurement of the first plurality of distance measurements and each distance measurement of the second plurality of distance measurements is an MMSE distance estimate.

In some cases, UE 115-*b* may determine a channel property associated with the beamformed transmission. UE 115-*b* may identify, based on the channel property, a number of REs associated with the beamformed transmission on which to apply the transformation matrix. The channel property may be a delay property, a Doppler spread property, or both. In some cases, the number of REs corresponds to a number of different sub-carriers in a same symbol period. In some instances, the number of REs corresponds to a number of sub-carriers located in a plurality of different symbol periods.

In some examples, UE 115-*b* may determine, in the transformed lattice domain, a third plurality of distance measurements between a second plurality of symbol pairs, each symbol pair of the second plurality of symbol pairs including the second symbol and a respective transformed constellation symbol of the plurality of transformed constellation symbols. UE 115-*b* may identify a subset of the second plurality of symbols pairs based on the third plurality of distance measurements.

UE 115-*b* may identify a second subset of the plurality of constellation symbols of the initial lattice domain that correspond to a second subset of the plurality of transformed constellation symbols included within the subset of the second plurality of symbols pairs. UE 115-*b* may determine in the initial lattice domain, a fourth plurality of distance measurements between the second symbol and a respective constellation symbol within the second subset of the plurality of constellation symbols. UE 115 may determine a second LLR for the second symbol based on the fourth plurality of distance measurements, where the second symbol may be decoded based on the second LLR.

In some instances, UE 115-*b* may apply the transformation matrix to the channel estimate to determine a transformed channel estimate. UE 115-*b* may perform matrix decomposition of the transformed channel estimate into a product of an orthogonal matrix and an upper triangular matrix. UE 115-*b* may apply the transformation matrix to an initial lattice domain to determine a transformed lattice domain, the initial lattice domain comprising a plurality of constellation symbols and the transformed lattice domain comprising a plurality of transformed constellation symbols. UE 115-*b* may determine, based on the orthogonal matrix and the upper triangular matrix, a first plurality of distance measurements between a plurality of symbol pairs in the transformed lattice domain, each symbol pair of the plurality of symbol pairs including the first symbol and a respective transformed constellation symbol of the plurality of transformed constellation symbols.

UE 115-*b* may identify a subset of the plurality of symbols pairs based on first plurality of distance measurements. UE 115-*b* may identify a subset of the plurality of constellation symbols of the initial lattice domain that correspond to a subset of the plurality of transformed constellation symbols included within the subset of the plurality of symbols pairs. UE 115-*b* may determine in the initial lattice domain, a second plurality of distance measurements between the first symbol and a respective constellation symbol within the subset of the plurality of constellation symbols. UE 115-*b* may determine, an LLR for the first symbol based on the second plurality of distance measurements, wherein the first symbol is decoded based on the LLR.

At 625, UE 115-*b* may decode the first symbol and a second symbol of the beamformed transmission based on the transformation matrix. In some cases, UE 115-*b* may decode a plurality of symbols of the beamformed transmission based on the transformation matrix, the plurality of symbols including the first symbol and the second symbol. In some aspects, a first subset of the plurality of symbols corresponds to a first spatial layer and a second subset of the plurality of symbols corresponds to a second spatial layer, the second spatial layer differing from the first spatial layer. In some cases, UE 115-*b* may generate a bit sequence based on decoding the first symbol and the second symbol. UE 115-*b* may then determine whether the bit sequence passes error detection. At 630, UE 115-*b* may then transmit, to base station 105-*b*, feedback (e.g., an ACK or a NACK) based on whether the bit sequence passes error detection.

Figure 7:
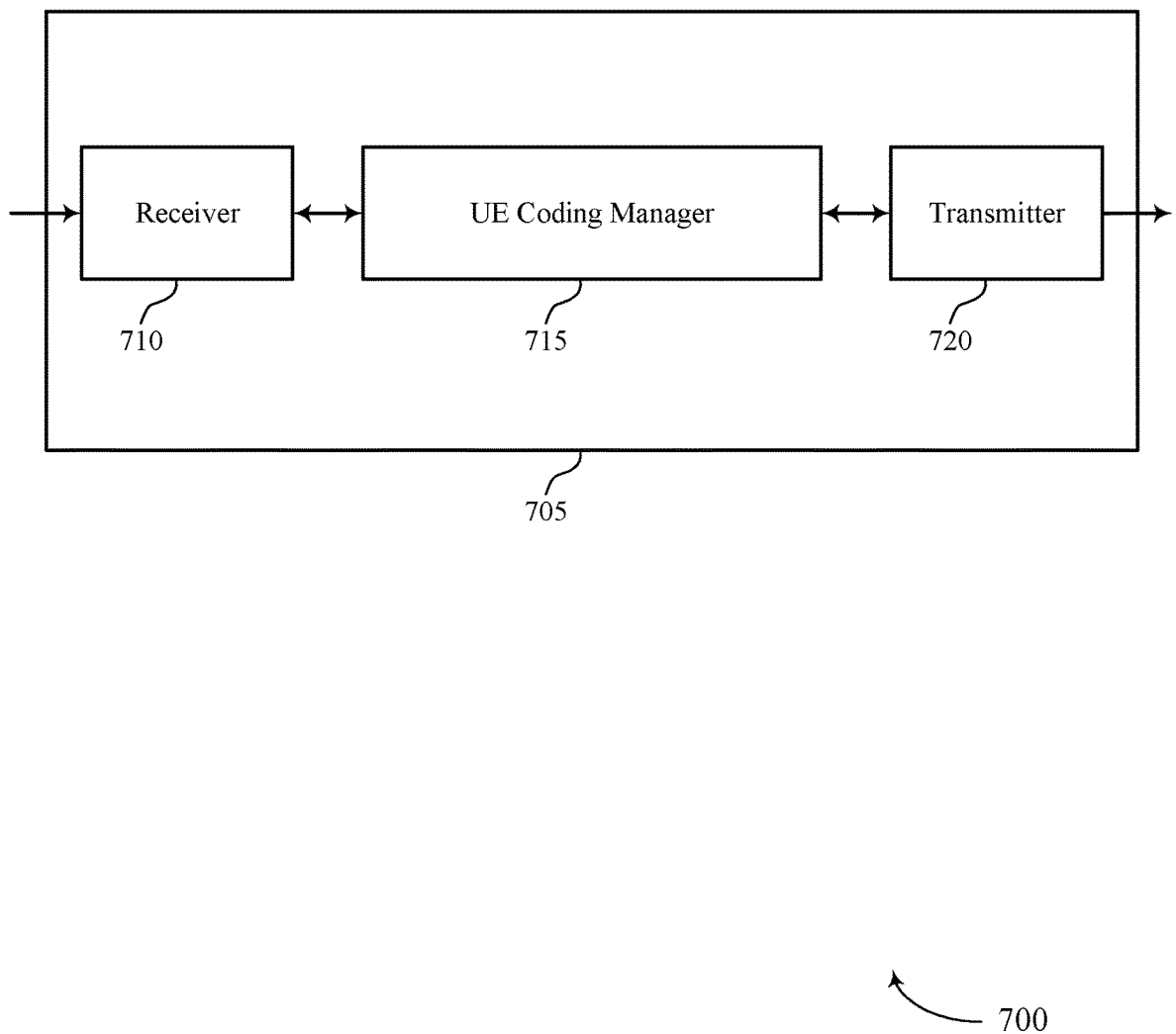
FIGS. 7 and 8 show block diagrams of devices in accordance with aspects of the present disclosure.

FIG. 7 shows a block diagram 700 of a device 705 that supports using LR for reduced demapper complexity in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to using LR for reduced decoder complexity). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a configuration message indicating a number of spatial layers and a modulation and coding scheme for a beamformed transmission, receive the beamformed transmission in accordance with the configuration message, determine a channel estimate for a resource element in which a first symbol of the beamformed transmission is received, apply LR to the channel estimate to determine a transformation matrix, and decode the first symbol and a second symbol of the beamformed transmission based on the transformation matrix. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field-programmable gate arrow (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
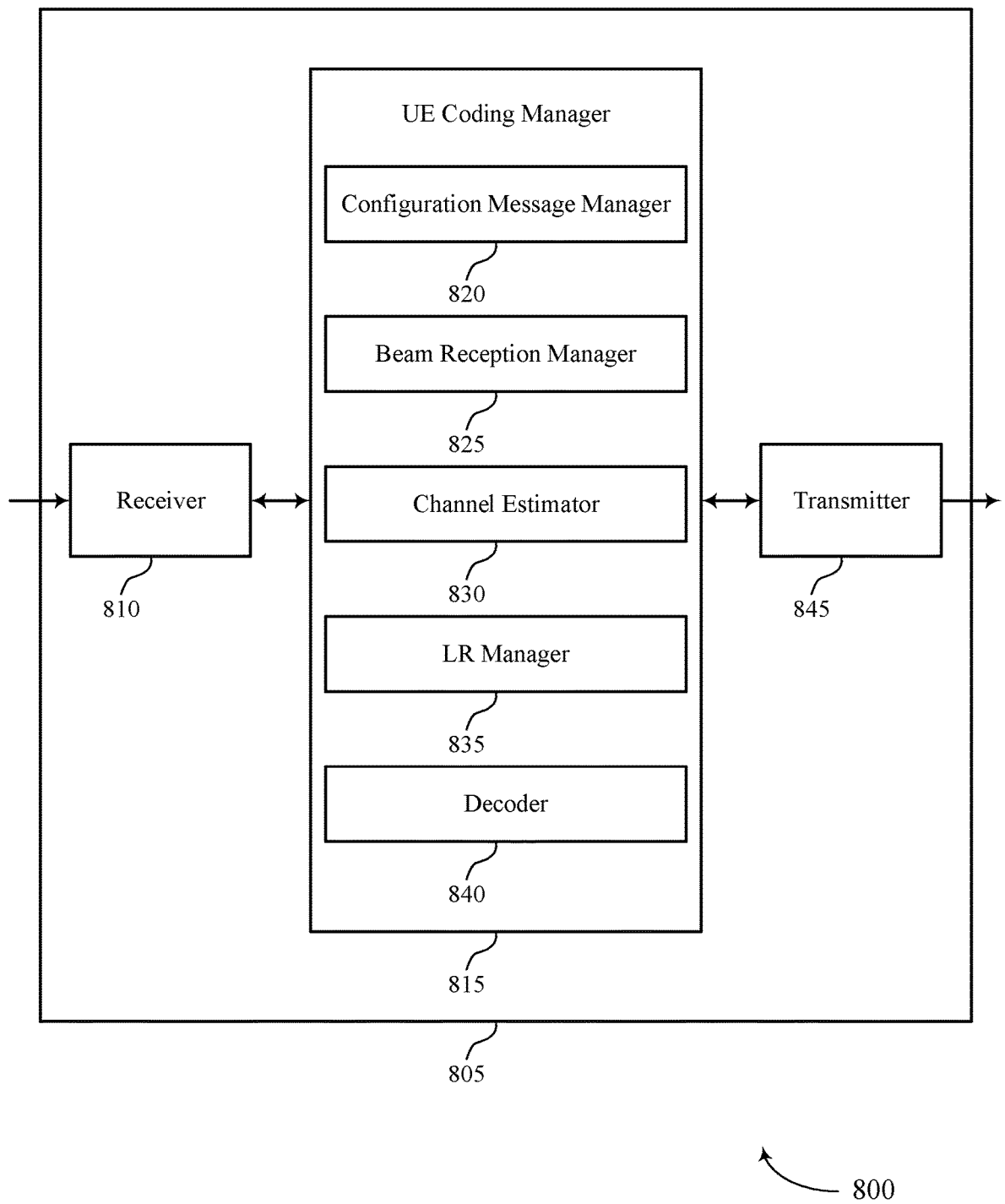

FIG. 8 shows a block diagram 800 of a device 805 that supports using LR for reduced demapper complexity in accordance with aspects of the present disclosure. The device 805 may be an example of aspects of a device 705 or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to using LR for reduced decoder complexity). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration message manager 820, a beam reception manager 825, a channel estimator 830, a LR manager 835, and a decoder 840. The communications manager 815 may be an example of aspects of the communications manager 1010 described herein.

The configuration message manager 820 may receive a configuration message indicating a number of spatial layers and a modulation and coding scheme for a beamformed transmission.

The beam reception manager 825 may receive the beamformed transmission in accordance with the configuration message.

The channel estimator 830 may determine a channel estimate for a resource element in which a first symbol of the beamformed transmission is received.

The LR manager 835 may apply LR to the channel estimate to determine a transformation matrix.

The decoder 840 may decode the first symbol and a second symbol of the beamformed transmission based on the transformation matrix.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
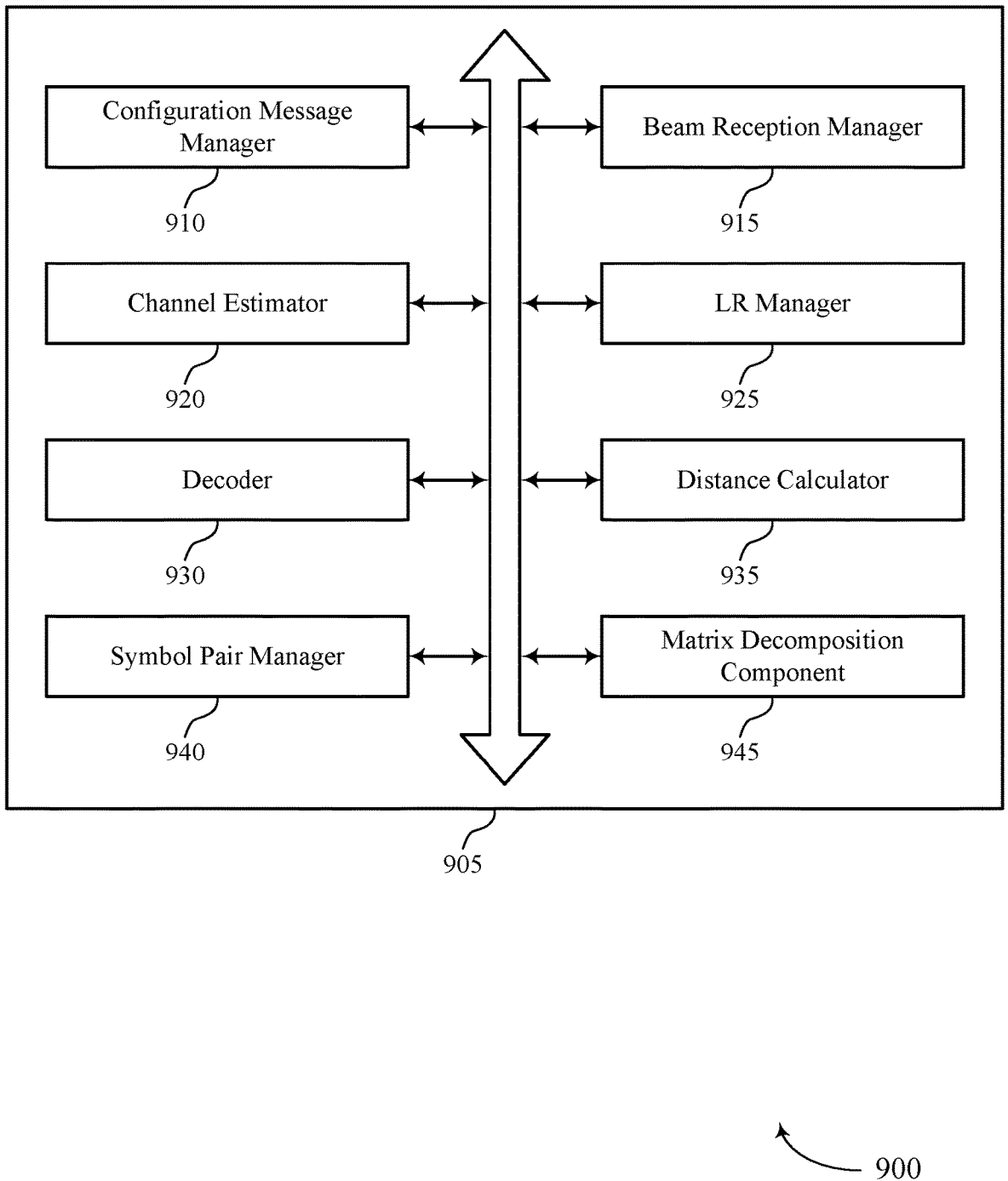
FIG. 9 shows a block diagram of a communications manager in accordance with aspects of the present disclosure.

FIG. 9 shows a block diagram 900 of a communications manager 905 that supports using LR for reduced demapper complexity in accordance with aspects of the present disclosure. The communications manager 905 may be an example of aspects of a communications manager 715, a communications manager 815, or a communications manager 1010 described herein. The communications manager 905 may include a configuration message manager 910, a beam reception manager 915, a channel estimator 920, a LR manager 925, a decoder 930, a distance calculator 935, a symbol pair manager 940, and a matrix decomposition component 945. Each of these modules may communicate, directly or indirectly, with one another (e.g., via one or more buses).

The configuration message manager 910 may receive a configuration message indicating a number of spatial layers and a modulation and coding scheme for a beamformed transmission. In some cases, the configuration message indicates a defined quadrature amplitude modulation and a defined coding rate for the beamformed transmission.

The beam reception manager 915 may receive the beamformed transmission in accordance with the configuration message. In some examples, the beam reception manager 915 may determine a channel property associated with the beamformed transmission. In some cases, the channel property is a delay property, a Doppler spread property, or both.

The channel estimator 920 may determine a channel estimate for a resource element in which a first symbol of the beamformed transmission is received.

The LR manager 925 may apply LR to the channel estimate to determine a transformation matrix. In some examples, the LR manager 925 may apply the transformation matrix to an initial lattice domain to determine a transformed lattice domain, the initial lattice domain including a set of constellation symbols and the transformed lattice domain including a set of transformed constellation symbols. In some cases, the LR manager 925 may determine the transformation matrix based on a column correlation criterion. In some instances, the LR manager 925 may identify, based on the channel property, a number of resource elements associated with the beamformed transmission on which to apply the transformation matrix. In some aspects, the LR manager 925 may apply the transformation matrix to the channel estimate to determine a transformed channel estimate. In some examples, the LR manager 925 may apply the transformation matrix to an initial lattice domain to determine a transformed lattice domain, the initial lattice domain including a set of constellation symbols and the transformed lattice domain including a set of transformed constellation symbols. In some cases, the number of resource elements corresponds to a number of different sub-carriers in a same symbol period. In some instances, the number of resource elements corresponds to a number of sub-carriers located in a set of different symbol periods. In some aspects, the transformation matrix includes real and integer numbers.

The decoder 930 may decode the first symbol and a second symbol of the beamformed transmission based on the transformation matrix. In some examples, the decoder 930 may determine a LLR for the first symbol based on the second set of distance measurements, where the first symbol is decoded based at least in part of the LLR. In some examples, the decoder 930 may determine a second LLR for the second symbol based on the fourth set of distance measurements, where the second symbol is decoded based on the second LLR. In some cases, the decoder 930 may decode a set of symbols of the beamformed transmission based on the transformation matrix, the set of symbols including the first symbol and the second symbol. In some instances, the decoder 930 may determine a LLR for the first symbol based on the second set of distance measurements, where the first symbol is decoded based on the LLR. In some aspects, the decoder 930 may generate a bit sequence based on decoding the first symbol and the second symbol. In some examples, the decoder 930 may determine whether the bit sequence passes error detection. In some cases, a first subset of the set of symbols corresponds to a first spatial layer and a second subset of the set of symbols corresponds to a second spatial layer, the second spatial layer differing from the first spatial layer.

The distance calculator 935 may determine, in the transformed lattice domain, a first set of distance measurements between a set of symbol pairs, each symbol pair of the set of symbol pairs including the first symbol and a respective transformed constellation symbol of the set of transformed constellation symbols.

In some examples, the distance calculator 935 may determine, in the initial lattice domain, a second set of distance measurements between the first symbol and a respective constellation symbol within the subset of the set of constellation symbols. In some cases, the distance calculator 935 may determine, in the transformed lattice domain, a third set of distance measurements between a second set of symbol pairs, each symbol pair of the second set of symbol pairs including the second symbol and a respective transformed constellation symbol of the set of transformed constellation symbols. In some instances, the distance calculator 935 may determine, in the initial lattice domain, a fourth set of distance measurements between the second symbol and a respective constellation symbol within the second subset of the set of constellation symbols.

In some examples, the distance calculator 935 may determine, based on the orthogonal matrix and the upper triangular matrix, a first set of distance measurements between a set of symbol pairs in the transformed lattice domain, each symbol pair of the set of symbol pairs including the first symbol and a respective transformed constellation symbol of the set of transformed constellation symbols. In some cases, each distance measurement of the first set of distance measurements and each distance measurement of the second set of distance measurements is a minimum mean square error distance estimate. In some instances, each distance measurement of the first set of distance measurements and each distance measurement of the second set of distance measurements is a successive interference cancellation distance estimate.

The symbol pair manager 940 may identify a subset of the set of symbols pairs based on the first set of distance measurements. In some examples, the symbol pair manager 940 may select a list size number of the set of symbol pairs based on the first set of distance measurements, each selected symbol pair of the set of symbol pairs having a shorter distance measurement than any unselected symbol pair of the set of symbol pairs. In some cases, the symbol pair manager 940 may identify a subset of a set of constellation symbols of the initial lattice domain that correspond to a subset of the set of transformed constellation symbols included within the subset of the set of symbols pairs.

In some examples, the symbol pair manager 940 may identify a subset of the second set of symbols pairs based on the third set of distance measurements. In some cases, the symbol pair manager 940 may identify a second subset of the set of constellation symbols of the initial lattice domain that correspond to a second subset of the set of transformed constellation symbols included within the subset of the second set of symbols pairs. In some instances, the symbol pair manager 940 may identify a subset of the set of symbols pairs based on first set of distance measurements. In some aspects, the symbol pair manager 940 may identify a subset of the set of constellation symbols of the initial lattice domain that correspond to a subset of the set of transformed constellation symbols included within the subset of the set of symbols pairs.

The matrix decomposition component 945 may perform matrix decomposition of the transformed channel estimate into a product of an orthogonal matrix and an upper triangular matrix.

Figure 10:
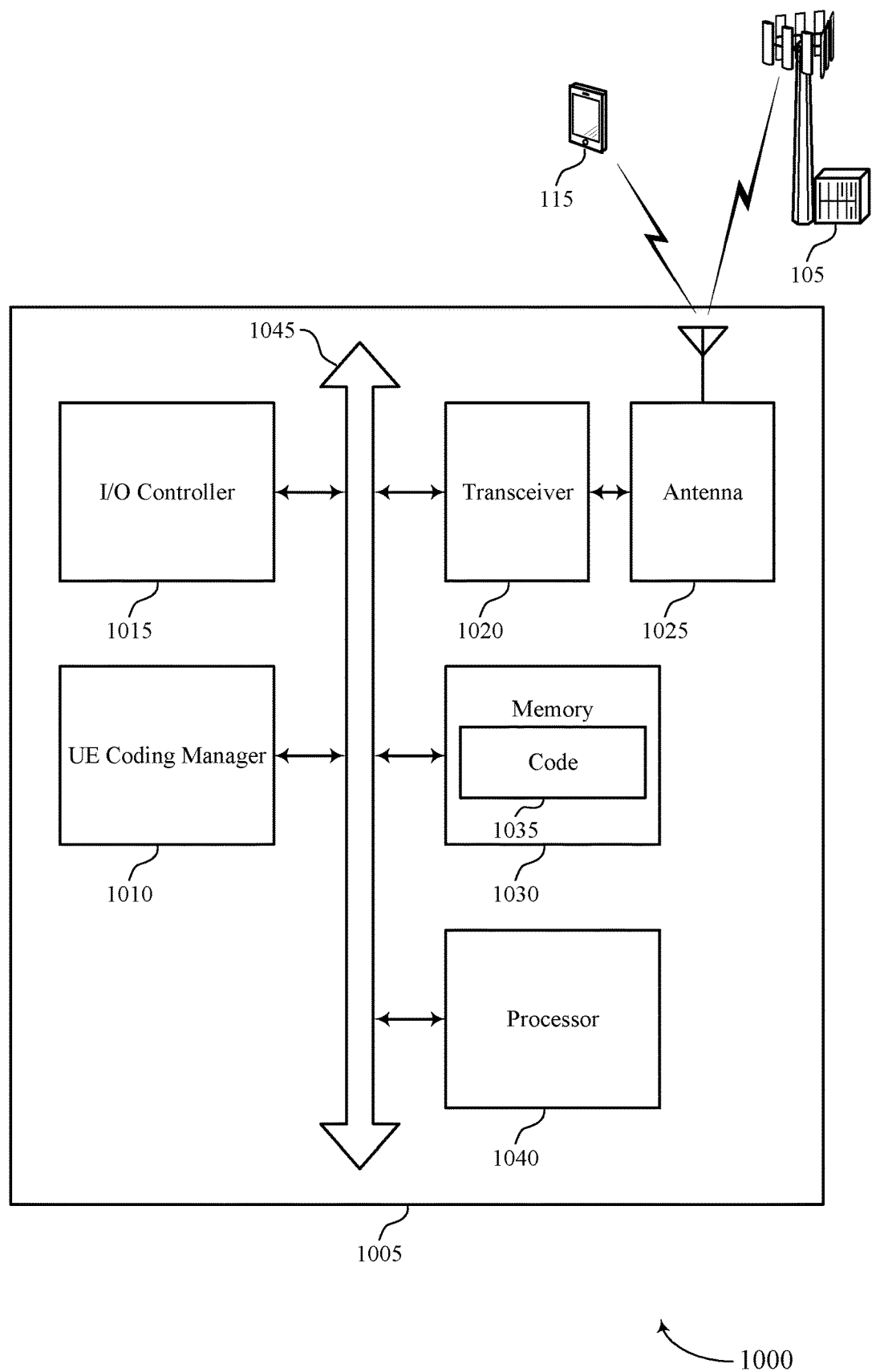
FIG. 10 shows a diagram of a system in accordance with aspects of the present disclosure.

FIG. 10 shows a diagram of a system 1000 including a device 1005 that supports using LR for reduced demapper complexity in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a configuration message indicating a number of spatial layers and a modulation and coding scheme for a beamformed transmission, receive the beamformed transmission in accordance with the configuration message, determine a channel estimate for a resource element in which a first symbol of the beamformed transmission is received, apply LR to the channel estimate to determine a transformation matrix, and decode the first symbol and a second symbol of the beamformed transmission based on the transformation matrix.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting using LR for reduced decoder complexity).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
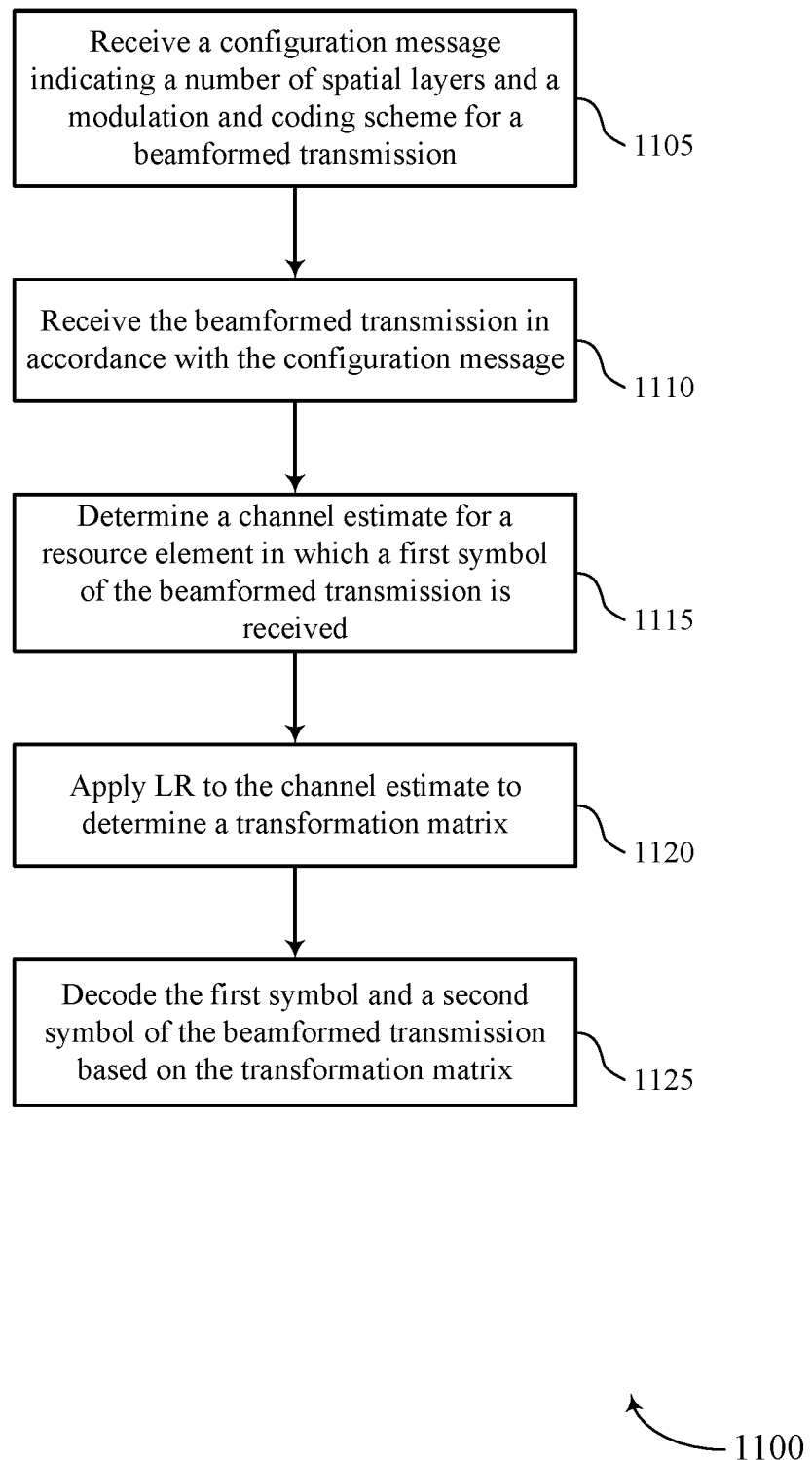
FIGS. 11 through 13 show flowcharts illustrating methods in accordance with aspects of the present disclosure.

FIG. 11 shows a flowchart illustrating a method 1100 that supports using LR for reduced demapper complexity in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may receive a configuration message indicating a number of spatial layers and a modulation and coding scheme for a beamformed transmission. The operations of 1105 may be performed according to the methods described herein. In some examples, aspects of the operations of 1105 may be performed by a configuration message manager as described with reference to FIGS. 7 through 10.

At 1110, the UE may receive the beamformed transmission in accordance with the configuration message. The operations of 1110 may be performed according to the methods described herein. In some examples, aspects of the operations of 1110 may be performed by a beam reception manager as described with reference to FIGS. 7 through 10.

At 1115, the UE may determine a channel estimate for a resource element in which a first symbol of the beamformed transmission is received. The operations of 1115 may be performed according to the methods described herein. In some examples, aspects of the operations of 1115 may be performed by a channel estimator as described with reference to FIGS. 7 through 10.

At 1120, the UE may apply LR to the channel estimate to determine a transformation matrix. The operations of 1120 may be performed according to the methods described herein. In some examples, aspects of the operations of 1120 may be performed by a LR manager as described with reference to FIGS. 7 through 10.

At 1125, the UE may decode the first symbol and a second symbol of the beamformed transmission based on the transformation matrix. The operations of 1125 may be performed according to the methods described herein. In some examples, aspects of the operations of 1125 may be performed by a decoder as described with reference to FIGS. 7 through 10.

Figure 12:
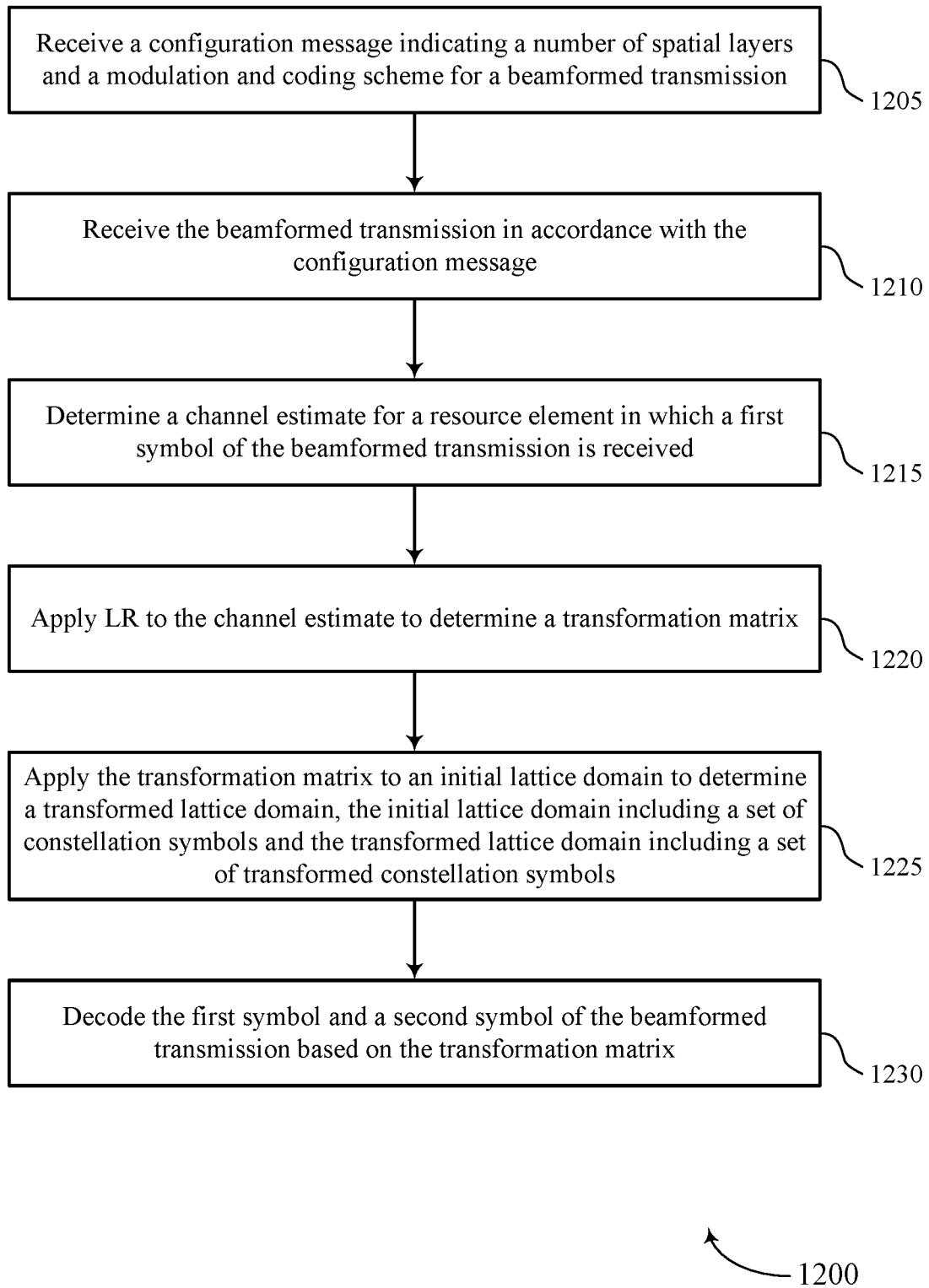

FIG. 12 shows a flowchart illustrating a method 1200 that supports using LR for reduced demapper complexity in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may receive a configuration message indicating a number of spatial layers and a modulation and coding scheme for a beamformed transmission. The operations of 1205 may be performed according to the methods described herein. In some examples, aspects of the operations of 1205 may be performed by a configuration message manager as described with reference to FIGS. 7 through 10.

At 1210, the UE may receive the beamformed transmission in accordance with the configuration message. The operations of 1210 may be performed according to the methods described herein. In some examples, aspects of the operations of 1210 may be performed by a beam reception manager as described with reference to FIGS. 7 through 10.

At 1215, the UE may determine a channel estimate for a resource element in which a first symbol of the beamformed transmission is received. The operations of 1215 may be performed according to the methods described herein. In some examples, aspects of the operations of 1215 may be performed by a channel estimator as described with reference to FIGS. 7 through 10.

At 1220, the UE may apply LR to the channel estimate to determine a transformation matrix. The operations of 1220 may be performed according to the methods described herein. In some examples, aspects of the operations of 1220 may be performed by a LR manager as described with reference to FIGS. 7 through 10.

At 1225, the UE may apply the transformation matrix to an initial lattice domain to determine a transformed lattice domain, the initial lattice domain including a set of constellation symbols and the transformed lattice domain including a set of transformed constellation symbols. The operations of 1225 may be performed according to the methods described herein. In some examples, aspects of the operations of 1225 may be performed by a LR manager as described with reference to FIGS. 7 through 10.

At 1230, the UE may decode the first symbol and a second symbol of the beamformed transmission based on the transformation matrix. The operations of 1230 may be performed according to the methods described herein. In some examples, aspects of the operations of 1230 may be performed by a decoder as described with reference to FIGS. 7 through 10.

Figure 13:
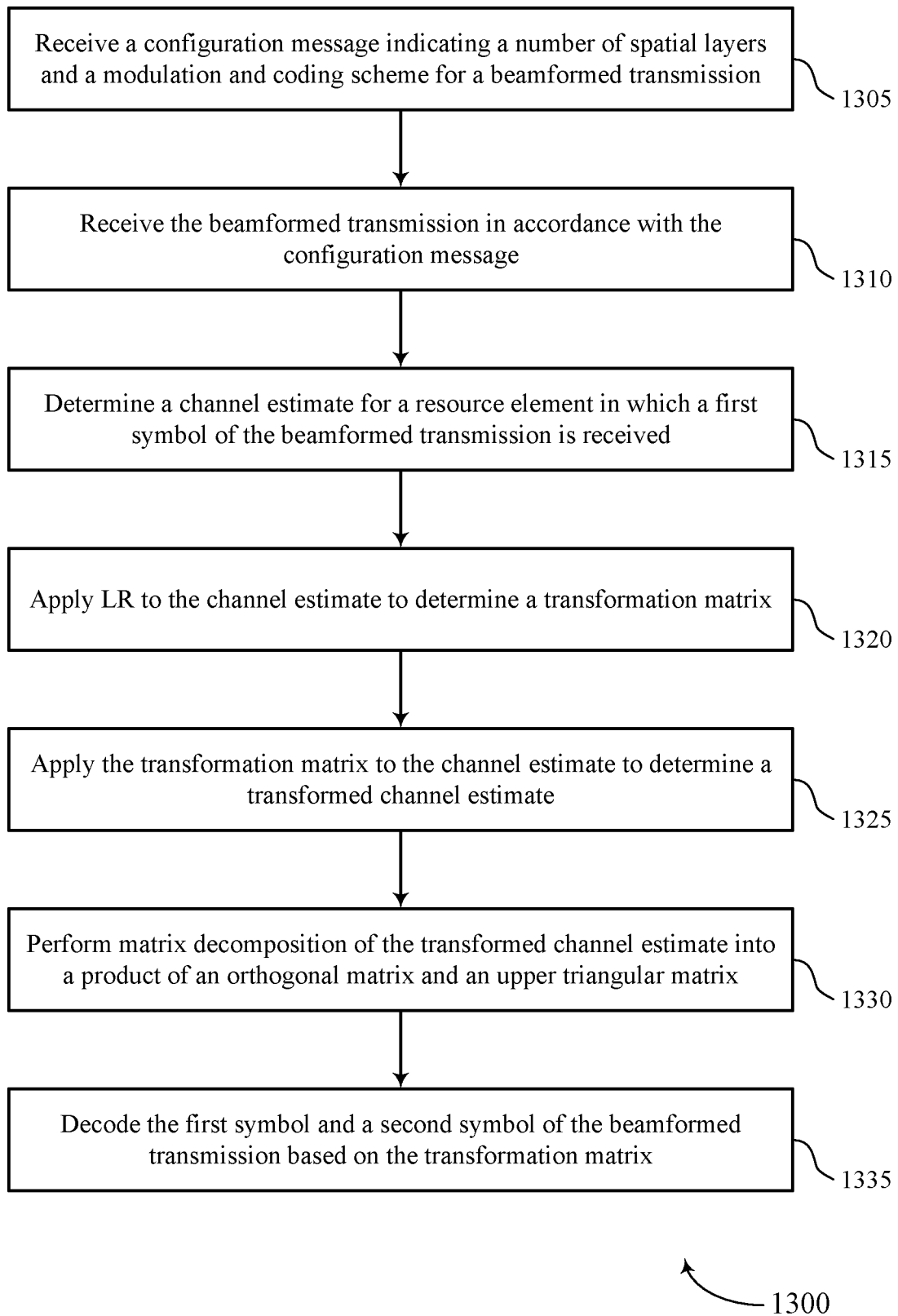

FIG. 13 shows a flowchart illustrating a method 1300 that supports using LR for reduced demapper complexity in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may receive a configuration message indicating a number of spatial layers and a modulation and coding scheme for a beamformed transmission. The operations of 1305 may be performed according to the methods described herein. In some examples, aspects of the operations of 1305 may be performed by a configuration message manager as described with reference to FIGS. 7 through 10.

At 1310, the UE may receive the beamformed transmission in accordance with the configuration message. The operations of 1310 may be performed according to the methods described herein. In some examples, aspects of the operations of 1310 may be performed by a beam reception manager as described with reference to FIGS. 7 through 10.

At 1315, the UE may determine a channel estimate for a resource element in which a first symbol of the beamformed transmission is received. The operations of 1315 may be performed according to the methods described herein. In some examples, aspects of the operations of 1315 may be performed by a channel estimator as described with reference to FIGS. 7 through 10.

At 1320, the UE may apply LR to the channel estimate to determine a transformation matrix. The operations of 1320 may be performed according to the methods described herein. In some examples, aspects of the operations of 1320 may be performed by a LR manager as described with reference to FIGS. 7 through 10.

At 1325, the UE may apply the transformation matrix to the channel estimate to determine a transformed channel estimate. The operations of 1325 may be performed according to the methods described herein. In some examples, aspects of the operations of 1325 may be performed by a LR manager as described with reference to FIGS. 7 through 10.

At 1330, the UE may perform matrix decomposition of the transformed channel estimate into a product of an orthogonal matrix and an upper triangular matrix. The operations of 1330 may be performed according to the methods described herein. In some examples, aspects of the operations of 1330 may be performed by a matrix decomposition component as described with reference to FIGS. 7 through 10.

At 1335, the UE may decode the first symbol and a second symbol of the beamformed transmission based on the transformation matrix. The operations of 1335 may be performed according to the methods described herein. In some examples, aspects of the operations of 1335 may be performed by a decoder as described with reference to FIGS. 7 through 10.

It should be noted that the methods described above describe possible implementations, and that the operations and the steps may be rearranged or otherwise modified and that other implementations are possible. Further, aspects from two or more of the methods may be combined. For example, as a UE goes into and out of mmW coverage, the UE may change from using a higher complexity maximum likelihood (ML) demapping procedure (e.g., PSRD) for sub-6 GHz frequency communications to (or from) lower complexity lattice reduction techniques for mmW communications.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
receiving a configuration message indicating a number of spatial layers and a modulation and coding scheme for a beamformed transmission;
receiving the beamformed transmission in accordance with the configuration message;
determining a channel estimate for a resource element in which a first symbol of the beamformed transmission is received;
applying lattice reduction to the channel estimate to determine a transformation matrix that reduces correlation between columns of a transformed channel estimate based at least in part on a column correlation criterion;
applying the transformation matrix to an initial lattice domain to determine a transformed lattice domain; and
decoding the first symbol and a second symbol of the beamformed transmission based at least in part on the transformed lattice domain.

2. The method of claim 1, wherein the initial lattice domain comprises a plurality of constellation symbols and the transformed lattice domain comprises a plurality of transformed constellation symbols.

3. The method of claim 2, further comprising:
determining, in the transformed lattice domain, a first plurality of distance measurements between a plurality of symbol pairs, each symbol pair of the plurality of symbol pairs including the first symbol and a respective transformed constellation symbol of the plurality of transformed constellation symbols; and
identifying a subset of the plurality of symbol pairs based at least in part on the first plurality of distance measurements.

4. The method of claim 3, wherein identifying the subset of the plurality of symbol pairs further comprises:
selecting a list size number of the plurality of symbol pairs based at least in part on the first plurality of distance measurements, each selected symbol pair of the plurality of symbol pairs having a shorter distance measurement than any unselected symbol pair of the plurality of symbol pairs.

5. The method of claim 3, further comprising:
identifying a subset of the plurality of constellation symbols of the initial lattice domain that correspond to a subset of the plurality of transformed constellation symbols included within the subset of the plurality of symbol pairs;
determining, in the initial lattice domain, a second plurality of distance measurements between the first symbol and a respective constellation symbol within the subset of the plurality of constellation symbols; and
determining a logarithmic likelihood ratio for the first symbol based at least in part on the second plurality of distance measurements, wherein the first symbol is decoded based at least in part of the logarithmic likelihood ratio.

6. The method of claim 5, wherein each distance measurement of the first plurality of distance measurements and each distance measurement of the second plurality of distance measurements is a minimum mean square error distance estimate.

7. The method of claim 5, further comprising:
determining, in the transformed lattice domain, a third plurality of distance measurements between a second plurality of symbol pairs, each symbol pair of the second plurality of symbol pairs including the second symbol and a respective second transformed constellation symbol of the plurality of transformed constellation symbols;
identifying a subset of the second plurality of symbol pairs based at least in part on the third plurality of distance measurements;
identifying a second subset of the plurality of constellation symbols of the initial lattice domain that correspond to a second subset of the plurality of transformed constellation symbols included within the subset of the second plurality of symbol pairs;
determining, in the initial lattice domain, a fourth plurality of distance measurements between the second symbol and a respective second constellation symbol within the second subset of the plurality of constellation symbols; and
determining a second logarithmic likelihood ratio for the second symbol based at least in part on the fourth plurality of distance measurements, wherein the second symbol is decoded based at least in part on the second logarithmic likelihood ratio.

8. The method of claim 1, wherein the decoding further comprises:
decoding a plurality of symbols of the beamformed transmission based at least in part on the transformation matrix, the plurality of symbols including the first symbol and the second symbol.

9. The method of claim 8, wherein a first subset of the plurality of symbols corresponds to a first spatial layer and a second subset of the plurality of symbols corresponds to a second spatial layer, the second spatial layer differing from the first spatial layer.

10. The method of claim 1, further comprising:
determining a channel property associated with the beamformed transmission; and
identifying, based at least in part on the channel property, a number of resource elements associated with the beamformed transmission on which to apply the transformation matrix.

11. The method of claim 10, wherein the number of resource elements corresponds to a number of different sub-carriers in a same symbol period.

12. The method of claim 10, wherein the number of resource elements corresponds to a number of sub-carriers located in a plurality of different symbol periods.

13. The method of claim 10, wherein the channel property is a delay property, a Doppler spread property, or both.

14. The method of claim 1, wherein the transformation matrix includes real and integer numbers.

15. The method of claim 1, wherein applying the lattice reduction further comprises:
applying the transformation matrix to the channel estimate to determine the transformed channel estimate; and
performing matrix decomposition of the transformed channel estimate into a product of an orthogonal matrix and an upper triangular matrix.

16. The method of claim 15, wherein: the initial lattice domain comprises a plurality of constellation symbols and the transformed lattice domain comprises a plurality of transformed constellation symbols; the method further comprising:

determining, based at least in part on the orthogonal matrix and the upper triangular matrix, a first plurality of distance measurements between a plurality of symbol pairs in the transformed lattice domain, each symbol pair of the plurality of symbol pairs including the first symbol and a respective transformed constellation symbol of the plurality of transformed constellation symbols;

identifying a subset of the plurality of symbol pairs based at least in part on the first plurality of distance measurements;

identifying a subset of the plurality of constellation symbols of the initial lattice domain that correspond to a subset of the plurality of transformed constellation symbols included within the subset of the plurality of symbol pairs;

determining, in the initial lattice domain, a second plurality of distance measurements between the first symbol and a respective constellation symbol within the subset of the plurality of constellation symbols; and determining a logarithmic likelihood ratio for the first symbol based at least in part on the second plurality of distance measurements, wherein the first symbol is decoded based at least in part on the logarithmic likelihood ratio.

17. The method of claim 16, wherein each distance measurement of the first plurality of distance measurements and each distance measurement of the second plurality of distance measurements is a successive interference cancellation distance estimate.

18. The method of claim 1, further comprising:
generating a bit sequence based at least in part on decoding the first symbol and the second symbol; and
determining whether the bit sequence passes error detection.

19. The method of claim 1, wherein the configuration message indicates a defined quadrature amplitude modulation and a defined coding rate for the beamformed transmission.

20. An apparatus for wireless communication at a wireless device, comprising:
a receiver;
a processor,
memory in electronic communication with the processor; and
instructions stored in the memory and executable by the processor to cause the apparatus to:
receive, via the receiver, a configuration message indicating a number of spatial layers and a modulation and coding scheme for a beamformed transmission;
receive, via the receiver, the beamformed transmission in accordance with the configuration message;
determine a channel estimate for a resource element in which a first symbol of the beamformed transmission is received;
apply lattice reduction to the channel estimate to determine a transformation matrix that reduces correlation between columns of a transformed channel estimate based at least in part on a column correlation criterion;
apply the transformation matrix to an initial lattice domain to determine a transformed lattice domain; and
decode the first symbol and a second symbol of the beamformed transmission based at least in part on the transformed lattice domain.

21. The apparatus of claim 20, wherein:
the initial lattice domain comprises a plurality of constellation symbols and the transformed lattice domain comprises a plurality of transformed constellation symbols.

22. The apparatus of claim 21, wherein the instructions are further executable by the processor to cause the apparatus to:
determine, in the transformed lattice domain, a first plurality of distance measurements between a plurality of symbol pairs, each symbol pair of the plurality of symbol pairs including the first symbol and a respective transformed constellation symbol of the plurality of transformed constellation symbols; and
identify a subset of the plurality of symbol pairs based at least in part on the first plurality of distance measurements.

23. The apparatus of claim 22, wherein the instructions to identify the subset of the plurality of symbol pairs further are executable by the processor to cause the apparatus to:
select a list size number of the plurality of symbol pairs based at least in part on the first plurality of distance measurements, each selected symbol pair of the plurality of symbol pairs having a shorter distance measurement than any unselected symbol pair of the plurality of symbol pairs.

24. The apparatus of claim 22, wherein the instructions are further executable by the processor to cause the apparatus to:
identify a subset of the plurality of constellation symbols of the initial lattice domain that correspond to a subset of the plurality of transformed constellation symbols included within the subset of the plurality of symbol pairs;
determine, in the initial lattice domain, a second plurality of distance measurements between the first symbol and a respective constellation symbol within the subset of the plurality of constellation symbols; and
determine a logarithmic likelihood ratio for the first symbol based at least in part on the second plurality of distance measurements, wherein the first symbol is decoded based at least in part of the logarithmic likelihood ratio.

25. The apparatus of claim 24, wherein each distance measurement of the first plurality of distance measurements and each distance measurement of the second plurality of distance measurements is a minimum mean square error distance estimate.

26. The apparatus of claim 24, wherein the instructions are further executable by the processor to cause the apparatus to:
determine, in the transformed lattice domain, a third plurality of distance measurements between a second plurality of symbol pairs, each symbol pair of the second plurality of symbol pairs including the second symbol and a respective second transformed constellation symbol of the plurality of transformed constellation symbols;
identify a subset of the second plurality of symbol pairs based at least in part on the third plurality of distance measurements;
identify a second subset of the plurality of constellation symbols of the initial lattice domain that correspond to a second subset of the plurality of transformed constellation symbols included within the subset of the second plurality of symbol pairs;

determine, in the initial lattice domain, a fourth plurality of distance measurements between the second symbol and a respective second constellation symbol within the second subset of the plurality of constellation symbols; and determine a second logarithmic likelihood ratio for the second symbol based at least in part on the fourth plurality of distance measurements, wherein the second symbol is decoded based at least in part on the second logarithmic likelihood ratio.

27. The apparatus of claim 20, wherein the instructions are further executable by the processor to cause the apparatus to:

determine a channel property associated with the beamformed transmission; and identify, based at least in part on the channel property, a number of resource elements associated with the beamformed transmission on which to apply the transformation matrix.

28. An apparatus for wireless communication at a wireless device, comprising:

means for receiving a configuration message indicating a number of spatial layers and a modulation and coding scheme for a beamformed transmission;

means for receiving the beamformed transmission in accordance with the configuration message;

means for determining a channel estimate for a resource element in which a first symbol of the beamformed transmission is received;

means for applying lattice reduction to the channel estimate to determine a transformation matrix that reduces correlation between columns of a transformed channel estimate based at least in part on a column correlation criterion;

means for applying the transformation matrix to an initial lattice domain to determine a transformed lattice domain; and means for decoding the first symbol and a second symbol of the beamformed transmission based at least in part on the transformed lattice domain.

29. A non-transitory computer-readable medium storing code for wireless communication at a wireless device, the code comprising instructions executable by a processor to:

receive a configuration message indicating a number of spatial layers and a modulation and coding scheme for a beamformed transmission;

receive the beamformed transmission in accordance with the configuration message;

determine a channel estimate for a resource element in which a first symbol of the beamformed transmission is received;

apply lattice reduction to the channel estimate to determine a transformation matrix that reduces correlation between columns of a transformed channel estimate based at least in part on a column correlation criterion;

apply the transformation matrix to an initial lattice domain to determine a transformed lattice domain; and decode the first symbol and a second symbol of the beamformed transmission based at least in part on the transformed lattice domain.

30. The apparatus of claim 20, wherein the instructions to decode the first symbol and the second symbol of the beamformed transmission further are executable by the processor to cause the apparatus to:

decode a plurality of symbols of the beamformed transmission based at least in part on the transformation matrix, the plurality of symbols including the first symbol and the second symbol.

* * * * *